United States Patent [19]
Bormans et al.

[11] Patent Number: 6,058,211
[45] Date of Patent: *May 2, 2000

[54] DATA COMPRESSION METHOD AND APPARATUS

[75] Inventors: Jan Bormans, Kessel-Lo; Gauthier Lafruit, Woluwe-St-Lambert; Hugo De Man, Leuven; Ivo Bolsens, Schoven; Jan Cornelis, Brussels, all of Belgium

[73] Assignee: IMEC vzw, Leuven, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,790

[22] Filed: Jul. 5, 1996

Related U.S. Application Data

[60] Provisional application No. 60/000,965, Jul. 7, 1995.

[51] Int. Cl.$^7$ .................................................. G06K 9/36
[52] U.S. Cl. ............................................ 382/235; 382/164
[58] Field of Search ..................................... 382/164, 169, 382/171, 235, 232, 233, 237, 247, 249, 199; 248/249, 243, 232, 199; 348/393, 395, 399, 403

[56] References Cited

U.S. PATENT DOCUMENTS

| | | | |
|---|---|---|---|
| 5,148,497 | 9/1992 | Pentland et al. | 382/249 |
| 5,257,116 | 10/1993 | Suzuki | 382/199 |
| 5,384,867 | 1/1995 | Barnsley et al. | 382/249 |
| 5,459,513 | 10/1995 | Oddou | 382/199 |

OTHER PUBLICATIONS

Bormans, et al., "A Fractal–Based Region–Oriented Color Image Compression Scheme For VLSI Implementation," *IEEE*, Oct. 1994, pp. 482–490.

Gan, et al., "Quantization Of ULCS Color Space Using The Peano Scan," *Swiss Federal Institute of Technology*, Mar. 1993, pp. 3.2/A–3.2/B.

Ansari, et al., "Image Data Ordering and Compression Using Peano Scan and Lot," *IEEE Transactions on Consumer Electronics*, vol. 38, No. 3, Aug. 1992, pp. 436–445.

Yang, et al., "Fractal Based Image Coding Scheme Using Peano Scan," 1998 IEEE International Symposium on Circuits and Systems, Jun. 1988, pp. 2301–2304.

Tominaga, S. "A color classification method for color images using a uniform color space", IEEE Comput. Soc. Press, 1990, 2 vol.

(List continued on next page.)

*Primary Examiner*—Amelia Au
*Assistant Examiner*—Samir Ahmed
*Attorney, Agent, or Firm*—Knobbe, Martens, Olson & Bear LLP

[57] ABSTRACT

The present invention relates to a method and apparatus for compressing digital data, such as the digital representation of a colored image. A scanning routine is described which aims to maintain the integrity of regions of the image that the human visual system also finds important. Pixel data from the image data includes color components, e.g., intensities of three or more colors such as red, green and blue or cyan, magenta and yellow. When the color components of the pixels are represented in color space, the axes of which are the three color components with the intensities thereof as variables, it has been found experimentally, particularly for artificial or synthetic images, that significant regions in the image tend to produce clusters of points in color space. In accordance with the invention, the color space is scanned by a space filling curve to convert the coordinates in color space into a one dimensional matrix such as a histogram. If certain types of space filling curves are used, e.g., a step-wise curve such as the Peano or Hilbert fractal, the clusters of points in color space tend to produce clusters of points in the histogram. Having obtained the histogram, it is segmented into a series of bins. These bins are used to segment the original image into regions which are coded.

Although the invention has been described with respect to color images and 3-D color space, the method and apparatus may be useful with other types of data and with multidimensional spaces.

21 Claims, 14 Drawing Sheets

OTHER PUBLICATIONS

M.S. Lazar "Fractal Block Coding of Digital Video" IEEE Trans. on Circuit & System for Video Techno–vol. 4, Issue 3, Jun. 1994.

Takeshi Naemura et al "Fractal Coding of Multi View 3–D Image", IEEE Image Processing, vol. 3, 1994.

Oleg Kiselyov et al "Self Similarity of the Multires–olutional Image, Video Decomposition. smart Expansion as compression of still & moving Pictures", IEE Data Compression, 1994.

Bially, T., "Space Filling Curves: Their generation and Their Application to Bandwidth Reduction", IEEE Transaction on Information Theory, vol. IT–15, No. 6, pp. 658–664, Nov. 1969.

Clarke, R.J., and Linnett, L.M., "Fractals and image representation," IEE Electronics and Communication, vol. 5, No. 4, Aug., 1993.

Eden, M. and Kocher, M., "On the Performance of a Contour Coding Algorithm in the Context of Image Coding: Part 1:. Contour Segment Coding," Signal Process., vol. 8, pp. 381–386, 1985.

Freeman, H., "On the Encoding of Arbitrary Geometric Configurations," IRE Trans. Electron. Comput. vol. EC–10, pp. 260–268, Jun. 1961.

Kaneko, T., and Okudaira, M., "Encoding of Arbitrary Curves Based on the Chain Code Representation," IEEE Trans. Com. COM–33, pp. 697–707, 1985.

Lambert, R.A., et al., "Segmentation of Colour Images Using Peano Curves on a Transputer Array," SPIE vol. 1615 Machine Vision Architectures, Integration, and Applications, pp. 187–193, 1991.

Lambert, R.A., et al., "A Method of Pre–processing Color Images Using a Peano Curve on a Transputer Array," SPIE vol. 1381 Intelligent Robots and Computer Vision IX: Algorithms and Techniques, pp. 582–588, 1990.

Moran, D., et al., "Region Image Coding Techniques," presented at the IEE Colloquim on Low Bit Rate Image Coding, London, May 1990.

Patrick, et al., "Mapping Multidimensional Space to a One Dimension for Computer Output Display," IEEE Transactions on Computers, vol. C–17, No. 10, pp. 949–953, Oct. 1968.

Stevens, R. J., et al., "Manipulation and Presentation of Multidimensional Image Data Using the Peano Scan," IEEE Transactions on Pattern Analysis and Machine Intelligence, vol. PAMI–5, No. 5, pp. 520–526, Sep. 1983.

Stevens, R. J., et al., "Data Ordering and Compression of Multispectral Images Using the Peano Scan," IEE International Conference on Electronic Image Processing, pp. 209–213, Jul. 1982.

DATA COMPRESSION METHOD AND APPARATUS

RELATED APPLICATIONS

This application claims priority from U.S. Provisional Application Ser. No. 60/000,965 filed on Jul. 7, 1995.

BACKGROUND OF THE INVENTION

1. Field of the Invention

The present invention relates to image processing and, more particularly, to a method of compressing data, particularly visual data, and an apparatus for carrying out the method.

2. Description of the Related Technology

Today, digital information, both stored and transmitted, is pervasive. This digital information may be stored in the form of files, each file containing related data. When such a file includes visual data, such as a picture or a video, it may be tens or hundreds of megabytes, or even gigabytes in size.

There is a general need to compress data for economic storage, analysis and transmission thereof without loosing the accuracy of the data or at least maintaining a functionally sufficient quantity of the data. The degree of compression necessary may vary. For video conferencing, a compression ratio of 100:1 or more may be required because of the limitations on data transmission by existing analogue or digital telephone lines. Similarly for the transmission and storage of large collections of still pictures via networks such as the Internet, very high compression ratios are advantageous. When visual data is stored as large files, there is a need to search in these files by a quick previewing method. Speed requires high compression and the final image need only be good enough to allow recognition of the subject matter. On the other hand for the compression of still picture of a natural scene, a 10:1 compression while maintaining very high fidelity could be a great advantage in reducing printing times.

Many systems for compression have already been proposed. For picture data, two common schemes are Block Oriented Compression (B3OC) and Region Orientated Compression (ROC).

In BOC an image is processed on a block by block basis, where a block is normally a rectangular part of the original image. An example of BOC is the standard MPEG2 compression method for video and television. An individual block, which is a matrix of data in which each element of the matrix represents the color of a pixel of the image, is operated on by the Discrete Cosine Transform (DCT) to produce a further matrix defined by the coefficients of the DCT. The DCT coefficients are quantized in order to reduce the number of bits required to code the coefficients and hence increase the compression. Further, the matrix with the quantized coefficients is sampled, usually in a diagonal zigzag fashion, and elements of the matrix which approach zero are ignored. At the receiving end, the image is reconstructed block by block using an inverse transform. The JPEG proposal for compression of still images also uses BOC and DCT. BOC using DCT is a preferred method when the degree of compression is low to medium (say less than 80:1 for still color images) and natural images are to be stored or transmitted. The method becomes less successful at the extremes of compression and when artificial images are to be stored, displayed or transmitted.

ROC involves the segmentation of an image into regions which are homogeneous with respect to a given image characteristic; for example, segmentation into regions of uniform grey level or of uniform texture. ROC has the advantage that at least the theoretical possibility exists of segmenting the image into regions which may bear some relation to the parts of the image considered important by the human visual system (HVS). Theoretically, this could provide an improvement over BOC which segregates the image into artificial rectangular blocks. Linked to ROC is often edge extraction of regions in the image. Segmentation into regions does not necessarily end up with the boundaries of the regions coinciding with edges, i.e., lines which define a significant intensity change. In conventional ROC schemes the region segmentation and edge extraction are carried out separately and each set of data is compressed separately.

ROC has received wide coverage in the technical press but has not been successful commercially. One reason for this is that conventional ROC segmentation routines are computationally intensive. Only since the introduction of high speed computers has it been possible to consider ROC techniques. There still remains a requirement for a ROC method and apparatus which has high compression, is easy to implement, requiring electronics which can be implemented as VLSI's or PC-based software and which provides a final image which is adapted to the requirements of the HVS.

The article by R. J. Stevens, A. F. Lehar and F. H. Preston entitled, "Manipulation and Presentation of Multidimensional Image Data Using the Peano Scan," IEEE Transactions on Pattern Analysis and Machine Intelligence, vol. PAMI-5, No. 5, Sept. 1983 describes a method of scanning color space using the Peano fractal curve. The method only relates to ordering and re-coloring data in a colored image. The amount of compression is minimal. The technique involves segmenting the histogram produced by the scan into a fixed number of bins and then re-coloring the pixels in the original image. The method is only suitable for pre-processing the image before conventional compression routines are carried out.

SUMMARY OF THE INVENTION

The present invention provides a method of compressing data comprising the steps of a) inputting a first matrix of digital data, each element of the first matrix being associated with a set of a plurality of "S" intensity values corresponding to "S" quantized levels of a characteristic of each element; b) determining an occurrence matrix on an element-by-element basis for the elements in the first matrix, each set of intensity values associated with an element in the first matrix representing a coordinate of a point in an "S" dimensional space, the "S" dimensional space having axes representing the intensity of the "S" quantized levels of the characteristic as variables, the position of an element in said occurrence matrix being determined by the distance from the origin to the coordinate of the point as determined by a step-wise space filling curve passing uniquely through each coordinate of the S-dimensional space; c) replacing each element of the first matrix by the distance from the origin in the S-dimensional space to the coordinate in the S-dimensional space representing the set of intensity values associated with that element to form a second matrix; d) segmenting the occurrence matrix into a variable finite number "P" of occurrence segments; and e) determining contour elements of first regions in said second matrix, said first regions being determined by segmenting the second matrix into first regions, the distance values in the S-dimensional space of each element of the second matrix in one first region of the second matrix falling into one of the "P" occurrence segments.

This method also includes the steps of f) storing the contour elements as a third matrix, said contour elements defining second regions in said third matrix corresponding to first regions in said second matrix; and g) coding the elements of one second region of the third matrix with a representative set of values for the elements of said one second region, each representative value being a distance from the origin in the S-dimensional space to a coordinate in the S-dimensional space, the set of representative values being calculated from the distances from the origin in the S-dimensional space to the coordinates in the S-dimensional space associated with the elements in the first region of said second matrix corresponding to the one second region.

The present invention also provides a method of decompressing digital data, comprising the steps of step a) receiving digital data representing the contour elements of regions in a first matrix and first characteristic data relating to a characteristic of elements in each region of said first matrix; step b) decoding said digital data to form said first matrix; and step c) replacing the first characteristic data of each element in each region of the first matrix by a set of a plurality "S" of intensity values corresponding to "S" quantized levels of a second characteristic to form a second matrix, each first characteristic data associated with an element in the first matrix representing the distance from the origin to a coordinate of a point in an "S" dimensional space as determined by a step-wise space filling curve passing uniquely through each coordinate of the S-dimensional space, the "S" dimensional space having axes representing the intensity of the "S" quantized levels of the second characteristic as variabes and the coordinates of the point representing the plurality "S" of intensity values corresponding to the "S" quantized levels of the second characteristic.

The present invention also provides a method of compressing data comprising the steps of step a) inputting a first matrix of digital data, each element of the first matrix being associated with a set of a plurality of "S" intensity values corresponding to "S" quantized levels of a characteristic of each element; step b) determining an occurrence matrix by scanning the "S" dimensional space having axes representing the intensity of the "S" quantized levels of the characteristic as variables, each set of intensity values associated with an element in the first matrix representing the coordinates of a point in the "S" dimensional space; step c) segmenting the occurrence matrix into a variable finite number "P" of occurrence segments; step d) segmenting the first matrix into regions, the set of intensity values of each element in one region of the first matrix representing a coordinate of the "S" dimensional space which falls into one of the "P" occurrence segments; and step e) assigning a representative set of intensity values to the elements in each region of the first matrix, the representative set of intensity values for each region being determined from the sets of intensity values of the elements in that region in the first matrix.

The present invention provides an apparatus for compressing data, comprising a receiver for inputting digital data in the form of a first matrix; a converter for determining an occurrence matrix on an element-by-element basis for the elements in the first matrix, each set of intensity values associated with an element in the first matrix representing a coordinate of a point in an "S" dimensional space, the "S" dimensional space having axes representing the intensity of the "S" quantized levels of the characteristic as variables, the position of an element in said occurrence matrix being determined by the distance from the origin to the coordinate of the point as determined by a step-wise space filling curve passing uniquely through each coordinate of the S-dimensional space; a first frame buffer for storing the occurrence matrix; a segmenter capable of segmenting the occurrence matrix into a variable finite number "P" of-occurrence segments; a second frame buffer for storing a second matrix, the second matrix being formed by replacing each element of the first matrix by the distance from the origin in the S-dimensional space to the coordinate in the S-dimensional space representing the set of intensity values associated with that element; and a third frame buffer for storing contour elements defining first regions in a third matrix, said first regions in said third matrix being determined by segmenting the second matrix into second regions, the distance values in the S-dimensional space of each element in one second region of the second matrix falling into one of the "P" occurrence segments.

The apparatus according to the invention may also include a coder for coding the elements of one first region of the third matrix with a representative set of values for the elements of that first region, the representative value being a distance from the origin in the S-dimensional space to a coordinate in the S-dimensional space, the set of representative values being calculated from the distances from the origin in the S-dimensional space to the coordinates in the S-dimensional space associated with the elements in the second region of the second matrix corresponding to the said one first region in said third matrix.

The invention also provides an apparatus for decompressing data, comprising means for inputting digital data representing contour elements of regions in a first matrix and first characteristic data relating to a characteristic of elements in each region of said first matrix; means for decoding said digital data to form said first matrix; and a converter for converting said first matrix into a second matrix, said second matrix being formed by replacing the first characteristic data of each element in each region of the first matrix by a set of a plurality of "S" intensity values corresponding to "S" quantized levels of a second characteristic, each first characteristic data associated with an element in the first matrix representing the distance from the origin to a coordinate of a point in an "S" dimensional space as determined by a step-wise space filling curve passing uniquely through each coordinate of the S-dimensional space, the "S" dimensional space having axes representing the intensity of the "S" quantized levels of the second characteristic as variables and the coordinates of the point representing the plurality of "S" intensity values corresponding to the "S" quantized levels of the second characteristic, and a frame buffer for storing said second matrix.

The invention provides the advantage of a near-real time compression and decompression of large size images.

The invention also provides the advantage of high compression ratios for artificial or synthetic images.

The invention also provides a method and apparatus for compressing data which may be easily implemented in VLSI technology.

The invention, its advantages and embodiments will be described with reference to the attached drawings. The dependent claims define further embodiments of the invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF THE ILLUSTRATIVE EMBODIMENTS OF THE INVENTION

Figures 1A, 1B:
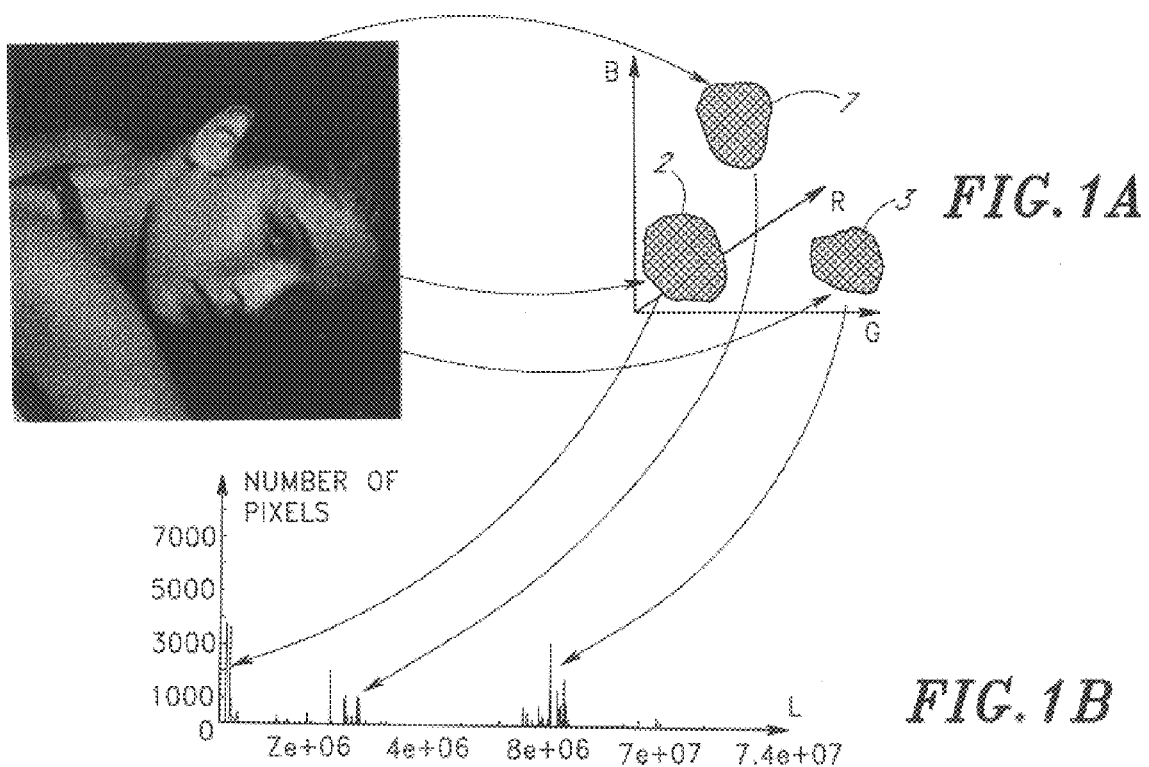
FIG. 1A shows the transform of an arbitrary image (here shown as a photograph of a person's head when lying down) into color space in accordance with the present invention.
FIG. 1B shows a histogram produced in accordance with the method of the present invention.

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

In the following text, the present invention will be described with reference to compression of graphic images and pictures. The invention is not limited thereto. The invention may be used with any data which can be represented as digital data, whereby a characteristic of each element of the digital data may be represented by a set of intensity values, e.g., not only color data but also audio data may be represented as a set of intensity values of quantized frequency ranges. The invention is also described generally with reference to a three component representation of the color of each element of the digital data. The invention is not limited thereto. The present invention is suitable for use with a two component as well as with a four or more component representations of color. For instance, the invention is suitable for use with the additive three component RGB (red, green, blue) system of color representation or generation as well as with the subtractive CMY (cyan, magenta, yellow) or the four component CMYK (cyan, magenta, yellow, black) system of color representation or generation. The invention is suitable for use independently of the number of intensity values required to represent the characteristic of each element of data. Further, the invention will be described with reference to a Cartesian color space. The invention is not limited thereto. For instance, the invention may be used, with the necessary modifications to the space filling curve, with a polar or cylindrical color space, e.g., the coordinate system developed by the CIE (Commission Illumination d'Eclaraige) in 1976, for further details see A. L. Robertson, "The CIE 1976 color difference formulae", Color Research and Application, vol. 2, no. 1, 1977, pages 7–11 or K. McLaren, "The Development of the CIE (L*, a*, b*)—uniform color space" , JSDC, Sep. 1976, pages 338 to 341 or the empirical Munsell color order system, for further details see G. Wyszecki and W: S. Stiles, Color Science, New York: Wiley, 1967.

Any color in a color image recorded on an analogue medium, e.g., a photograph or a dispositive (a positive formed on a transparent support such as glass), may be any of an unlimited number of colors. Each color is electromagnetic radiation defined by the scalar quantity of its frequency. If such an image is digitized it is represented by a finite number of individual elements or pixels A which may be represented by an MxN image matrix:

$$\begin{pmatrix} A_{11}, & \ldots, & A_{1N} \\ A_{21}, & \ldots, & A_{2N} \\ \ldots & & \\ A_{MI}, & \ldots, & A_{MN} \end{pmatrix}$$

It is well known that it is possible to represent a color by the sum of at least three primary colors, alternatively the subtraction of three primary colors from white light. Even combinations of two colors may give a colored image which does not contain true colors but may be sufficient to give an approximately realistic impression. The number of colors which may be represented is usually quantized, e.g., with an 8-bit representation of a grey scale, 256 different shades of grey may be represented whereas with a 24-bit color representation, in which each component of the RGB or CMY has 8 bits, theoretically, 16.8 million discrete colors may be represented. Each pixel may be defined by a set of intensity values of the primary colors, e.g., intensities of red, blue, green (RGB); cyan, magenta, yellow (CMY); or cyan, magenta, yellow and black (CMYK). The primary colors are referred to in this application as the quantization levels or "components" of the characteristic of the elements of the image matrix. Generally, each pixel may be represented by a set S of intensity values I, corresponding to S quantization levels or components of the particular characteristic "color". The complete image is then representable by S, MxN matrices:

$$\begin{pmatrix} I_{11}^1, & \ldots, & I_{1N}^1 \\ \ldots & & \\ \ldots & & \\ I_{MI}^1, & \ldots, & I_{MN}^1 \end{pmatrix} = \text{matrix } 1$$

$$| \quad = \text{matrices 2 to } S - 1$$

$$\begin{pmatrix} I_{11}^S, & \ldots, & I_{1N}^S \\ \ldots & & \\ \ldots & & \\ I_{M1}^S, & \ldots, & I_{MN}^S \end{pmatrix} = \text{matrix } S$$

where $I_{xyz}$ is the intensity of the $z^{th}$ quantization level or component (i.e., one of the primary colors) of the characteristic property (here the color) of the pixel or element Axy of the image matrix. For example, for an RGB representation of the color of each pixel, S equals 3; for the CMYK representation, S equals 4.

The color of each pixel $A_{xy}$ may be represented as a coordinate $(I_{xy}^1 \ldots, I_{xy}^S)$ in a color space whose axes are the intensities of the S components of the characteristic as variables. Pixel data from images will normally tend to form clusters in color space, each cluster relating to closely related colors of one object in the image, e.g., flesh tones in the face of a person, the blue tones of the sky on a sunny day. FIG. 1A shows a three dimensional color space (RGB or CMY, for instance) in which pixel color data of an arbitrary image is shown. The clusters 1, 2, 3 relate to three distinct objects in the original image. The original color image in this example is of a person's shoulders and head when lying down.

In the following detailed description of the invention, non-limiting reference will be made to three component color representation systems, e.g., RGB or CMY, as it is easier to describe, display and understand three dimensional spaces. Where appropriate, reference will be made to the more general S dimensional space of an arbitrary characteristic of the data represented by the intensities of S components.

Figure 2:
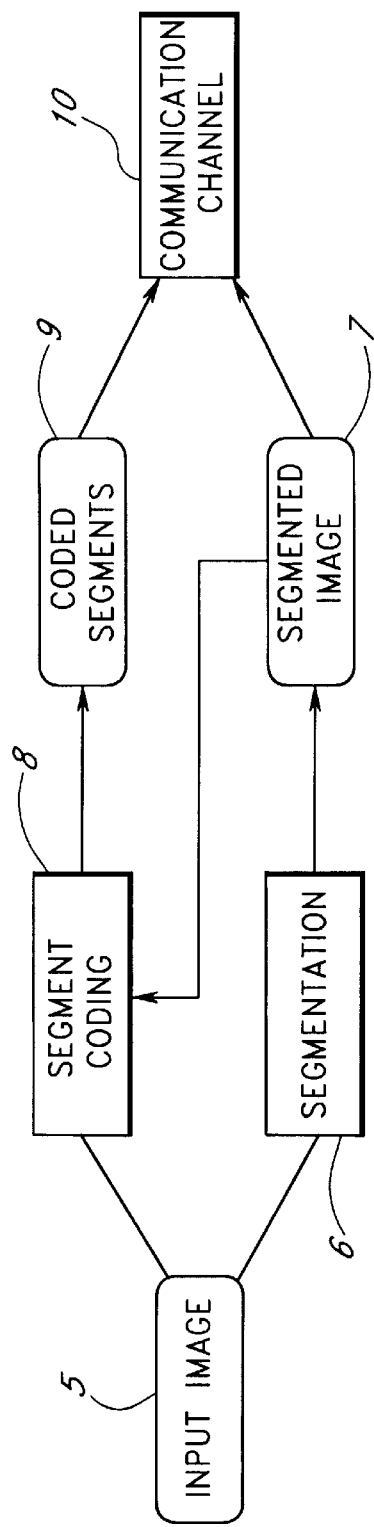
FIG. 2 is a block diagram of a grey scale compression routine in accordance with the present invention.

In ROC, an attempt is made to segment the image matrix into regions which bear a close relation to the objects in the image perceived by the human visual system (HVS). ROC basically consists of a segmentation stage followed by a coding of the regions. FIG. 2 shows a flow diagram for grey scale or one-component images in accordance with the present invention. The input image 5 is segmented in a segmentation function 6 into regions of uniform levels of grey to form a segmented image 7. Grey scale data relating to each of the regions from image 7 is determined in a segment coding function 8 and is output via coded segments 9 to the communication channel 10. The contours of the regions are coded to form contour output data which is outputted to the communication channel 10.

Advantageously, ROC may produce high compression ratios, particularly in artificial or computer generated images. At low compression ratios, BOC may be preferred because of its low computational and implementational complexity. High compression implies that locally, at the edges of the regions, large errors may occur. Since the HVS masks errors that coincide with object borders, it is advantageous if the segmentation stage produces regions with edges coinciding with the borders of the objects recognized by the HVS. This is particularly important in the compression of 3-D images. 3-D still, television or video images are usually produced from two normal images which are viewed separately by each eye. This may be achieved by each stereoscopic image being orthogonally polarized with respect to the other and the viewer wears glasses having polaroid lenses whereby the axes of polarization of the two lenses are orthogonal to each other, or by green and red images and the viewer wears glasses with green and red lenses. Alternatively, the two stereoscopic images may be formed by alternate lines of an interlaced television picture and the viewer has glasses which have light valves opening and closing synchronously with the lines. The HVS relies upon edge discrimination of objects in order to generate the 3-D effect. If the segmentation results in relative movement of edges of an object in the two images, the position of the object in the perceived 3-D image changes. This might result, for instance, in the disconcerting effect that one of the eyes of a person might be behind or in front of the head.

It is advantageous if the latency which is introduced by the ROC system is kept to a minimum: latency is important for interactive or near real-time systems. Latency is the delay between inputting and outputting data and is a measure of the amount of data which must be stored during processing. A desirable segmentation algorithm should have a small latency, mainly to limit the required intermediate storage and input buffering, especially if the image segmentation is part of a feedback loop (e.g., when iterating the segmentation towards a specified number of contour pixels.

Figure 3:
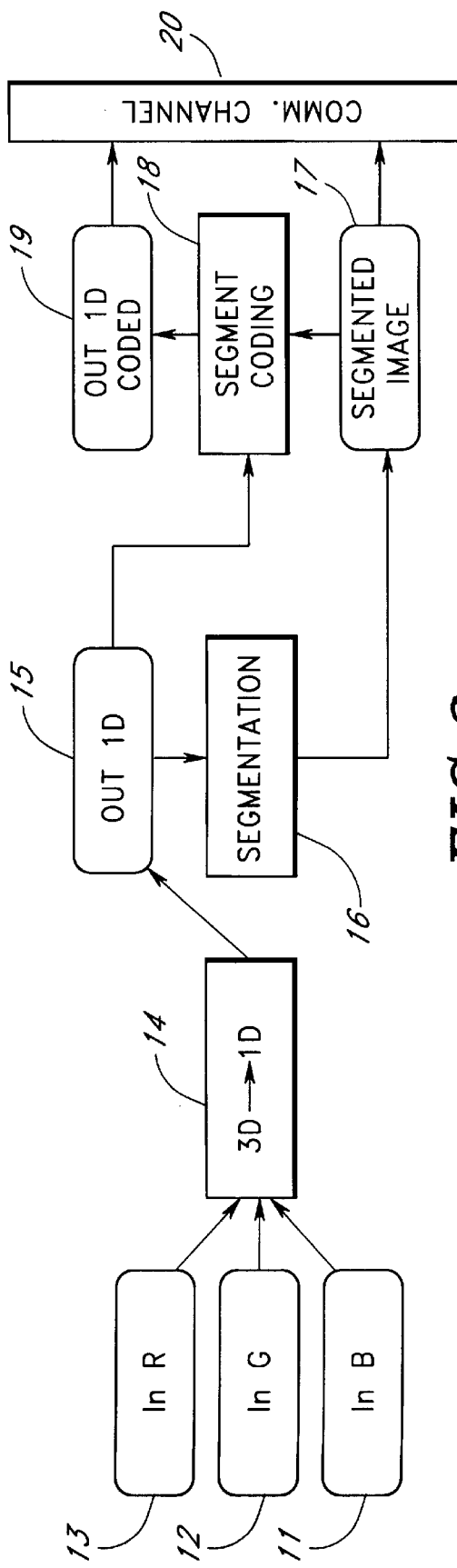
FIG. 3 is a block diagram of colored image ROC routine in accordance with the present invention.

In accordance with the present invention a single segmentation-single coding scheme is preferred. These schemes combine the components (preferably in a reversible way) into one component, used for both segmentation into regions and segment coding to produce the coded contour pixel data. FIG. 3 is a schematic diagram of a single segmentation-single coding scheme in accordance with the present invention. In the coder, the color separated RGB data 11, 12, 13 from the input image (generally, the intensity values of the S components of each element of data) is represented in 3-D color space (generally, S-dimensional space) and transformed in a 3-D to 1-D function 14 into a 1-D matrix 15 by means of a suitable algorithm. Clusters of data in the 1-D matrix 15 are used to define segments of the 1-D matrix called bins. The dividing lines between bins in the 1-D matrix 15 are used for the segmentation function 16 to produce a segmented image 17. The segmented image 17 has a finite number of regions. Each region in the segmented image 17 is defined by contour pixels. Contour pixel data from the image 17 is output to a communication channel 20. The 1-D representation 15 is used with the region data from the segmented image 17 to determine the color associated with each region in a segment coding function 18 based on the data in that region. From the segment coding function 18, the region color data is output as a 1-D bit stream 19 to the communication channel 20. On receipt of the data, the decoder (not shown) performs the reverse procedure.

The compression ratio CR of such a scheme may be expressed as:

$$CR = \frac{3 \times b \times N \times M}{B_c \times c + 3 \times b \times r}$$

where:
b represents the number of bits used to represent a color component,
N,M represents the image dimensions,
$B_c$ represents the number of bits to represent a contour pixel,
c represents the number of contour pixels,
r represents the number of regions.

The contribution of the coding of the contour pixels in highly compressed images should not be neglected. Different coding rates of contour pixels can be found, e.g., 3 bit/contour pixel, H. Freeman, "On the encoding of arbitrary geometric configurations", IRE Trans. Electron. Comput., vol. EC-10, pages 260–268, Jun. 1961, down to 1.27 bit/contour pixel, M. Eden, M. Kocher, "On the performance of a contour coding algorithm in the context of image coding:. Part1: Contour segment coding", Signal Process., vol. 8, pages 381 to 386, 1985, all of which documents are incorporated herein by reference. Experience has shown that if all overhead (e.g., pointers to different regions) is included and severe constraints (no non-connecting contours, only smooth regions) are rejected, a realistic coding results in no less than 1.9 bit/contour pixel (see also T. Kaneko, M. Okudaira, "Encoding of Arbitrary Curves Based on the Chain Code representation", IEEE Trans. Com. COM-33, pages 697 to 706, 1985, incorporated here by reference).

Consider the following typical values: b=8,N=M=256,$B_c$=1.9,c=4000,r=250. The compression ratio of a single-segmentation scheme is 116:1 with a relative contribution of 56:1 from the contour pixels. The conclusion remains valid that, when dealing with high compression ratios, the relative contribution of the contour pixels is high. A single-segmentation single-coding scheme is preferred in accordance with the present invention. Both the address generation complexity and the number of memory accesses are decreased in a significant way, since only one segment coding process exists. Hence, only one (instead of three) process accesses the segmentation information and the intermediate memory needed for the segment coding. It has been shown that memory accesses and address generation are the bottle-necks when implementing complex image processing algorithms. When realizing the scheme in VLSI, the interconnection overhead is reduced in the single-segmentation single-coding scheme thanks to the reduction of functional building blocks. The 3-D to 1-D conversion in accordance with the present invention in the coder (and the 1-D to 3-D. conversion in the decoder) introduces a small overhead. Therefore, a single-segmentation single-coding scheme is performed.

Different one-dimensional segmentation spaces have been proposed, such as the intensity and the hue. The transforms to these spaces have the disadvantage that they are not reversible, so that the coding stage can not be performed in these spaces (e.g., these segmentation is performed on a gray-scale version of the image, and the coding is computed according to this segmentation in the color space). Multi-dimensional space to one-dimensional space transforms such as performed by function 14 of FIG. 3 in accordance with the present invention are preferably reversible. In accordance with the present invention the multi-dimensional color space is sampled by a step-wise space filling curve with unique mapping to the 1-D space to generate an occurrence matrix (generally, the S-dimensional space is sampled by a step-wise space filling curve with unique mapping into the 1-D space). The simplest form of occurrence matrix is a histogram. For each pixel $A_{xy}$ of the image matrix, the distance L from the origin in color space to the coordinate $(I_{xy}^1, I_{XY}^2, I_{xy}^3)$ of this pixel's color along the step-wise space filling curve is calculated.

The distance L defines the X axis in the histogram shown in FIG. 1B as a variable. The Y axis is defined by the number of pixels in the image data which have a color which has a certain length L when transformed into the 1-D space. The histogram defines the number of times that a particular color occurs in the image data and is therefore an occurrence matrix $(O_{L1}, \ldots, O_{LW})$, where $O_{Lj}$ is the number of color occurrences at the distance $L_j$ from the origin of the color space along the step-wise form filling curve. The invention is not limited to simple histograms. Occurrence matrix (O) may be multi-dimensional. For example, the occurrence may include data relating to weighting factors for particular lengths L. For instance, if cartoons or maps are to be coded, the lengths L corresponding to the colors of certain lines, e.g., black lines in a cartoon or the colors of roads on a map, may be given a different weighting so that these are preferentially selected as regions in the image.

In accordance with the present invention, it is preferred if the step-wise space filling curve is an unbroken curve which passes through every element in the color space. It is preferred if each step of the curve ends and begins on coordinates in the color space which coincide with the coordinates of the quantized color representation, but the invention is not limited thereto. It is further preferred if the step-wise space filling curve is such that pixels close together in the image matrix correspond to data in the 1-D transform which is close together or clustered. It is also preferred if the step-wise space filling curve is such that data close together in the 1-D transform corresponds to pixels close together in the image matrix. The latter property is important since high compression implies that the coding stage introduces errors, which could be amplified significantly in the decoder by discontinuities in the 1-D to 3-D conversion. It is preferred if the stepwise space filling curve has certain properties of a either a deterministic or a random fractal. In particular, it is advantageous if the space filling curve has deterministic or statistical self-similarity. For further details of self-similarity of space filling curves, especially fractals, see "Fractals and image representation", R. J. Clarke and L. M. Linnett, IEE Electronics and Communication, vol. 5, No. 4, Aug., 1995, which is incorporated herein by reference. Self-similarity may provide the advantage that if the number of regions of the image are varied to maintain the compression ratio within acceptable levels, the loss of some of the regions will leave the remaining regions in the same place (the regions are organized in a hierarchical tree structure). This property allows better control of the compression ratio by varying the number of regions used for the segmentation. It is also preferred that the length of the step-wise space filling curve from the origin to any arbitrary coordinate in the color space may be calculated by simple arithmetical routines. This simplifies the transformation of pixel data in the image matrix to the 1-D occurrence matrix.

For example, in accordance with the present invention, the 3-D to 1-D transform may be calculated by scanning the 3-D color space with a Hilbert fractal (often called the Peano curve) scan or a dovetail fractal scan or a similar scan based on a step-wise form filling curve as defined above. Alternatively, the transform may be made by a raster scan. It is thus a priori possible to perform the segmentation and the segment coding in the same one-dimensional space. The raster scan and the Hilbert scan are described in "Data ordering and compression of multispectral images using the Peano scan", R. J. Stevens, A. F. Lehar and F. H. Peterson, IEE International Conference on Electronic Image Processing, pages 209 to 213, Jul., 1982, see also "A method of pre-processing color images using a Peano Curve on a Transputer array," R. Lambert and B. Batchelor, SPIE Vol. 1381 Intelligent Robots and Computer vision IX: Algorithms and Techniques, pages 582 to 588, 1990 and "Manipulation and presentation of multi-dimensional Image data using the Peano scan", R. J. Stevens, A. F. Lehar, and F. H. Preston, IEEE Transactions on Pattern Analysis and Machine Intelligence, vol. PAMI-5, No. 5, Sept. 1983, and the dovetail fractal is described in "Mapping Multidimensional Space to a one Dimension for Computer Output Display", IEEE Transactions on Computers, vol. C-17, No. 10, pages 949 to 953, Oct. 1968, all of which are incorporated herein by reference.

Figure 4:
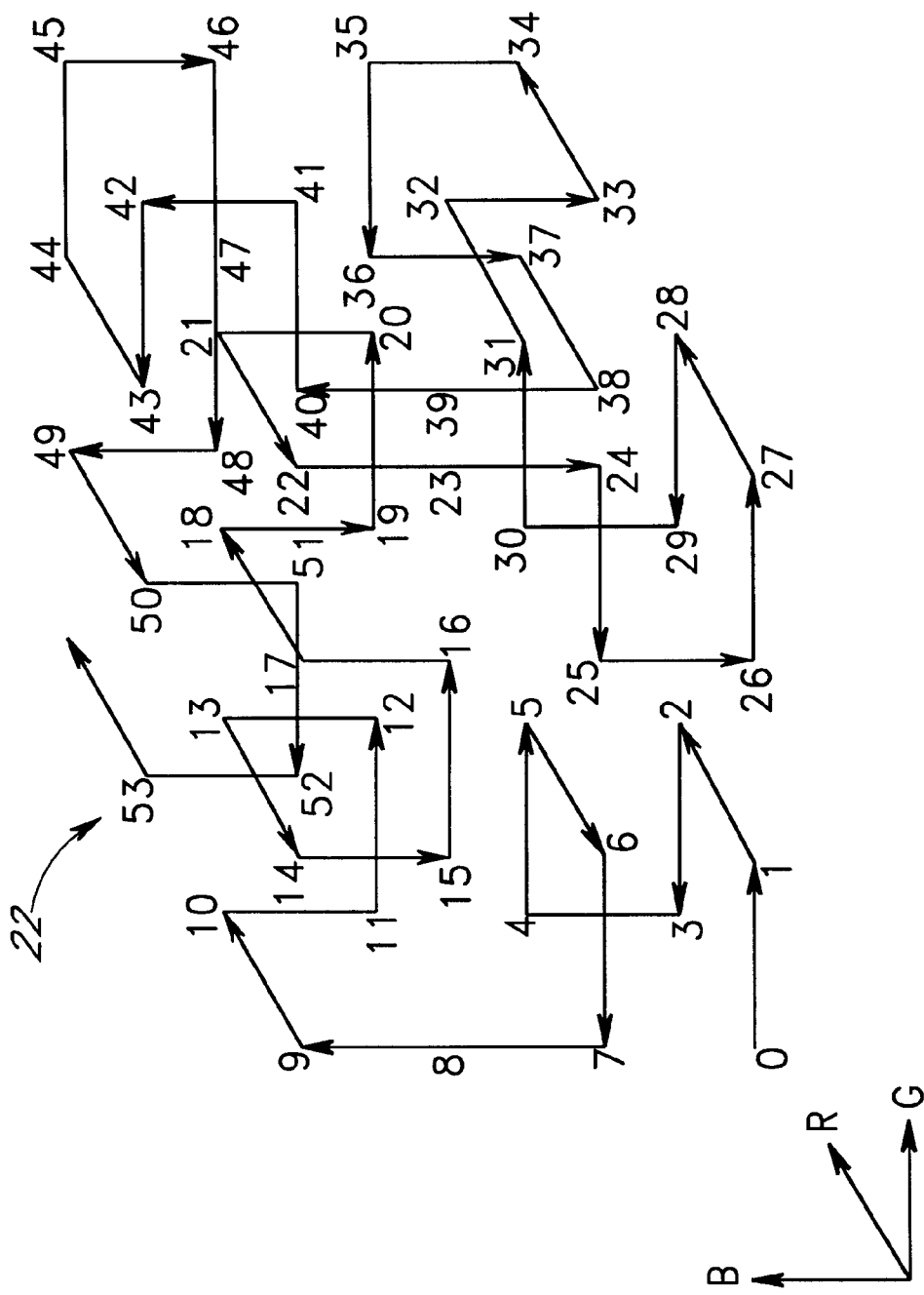
FIG. 4 shows a Hilbert fractal curve.

The occurrence matrix calculated by means of the raster scan results in each component of the color representation being distributed along the length $L_{raster}$ in a line. The occurrence matrix calculated by means of the Hilbert scan results in the color of each pixel being represented as a length $L_{Hilbert}$ traversed by the Hilbert fractal curve from the origin to the coordinate of the color in color space. As an example R=2, G=0, and B=3, as shown by reference number 22 results in an $L_{Hilbert}$ of 59 units as shown by the dashed line in FIG. 4.

The impact of the errors introduced in the coding stage has been calculated by modelling these errors in a first approximation as a loss of significance of the least significant bits of the distance L. The entwinement of the bits in a Hilbert scan results in a uniform spreading of the compression errors over the color components, whereas using the raster scan concentrates the errors into one color component. The robustness of the Hilbert scan with respect to compression errors is a result of its self-similar or multi-resolutional fractal nature: the loss of least significant bits corresponds to a coarser detail level of the color space.

Figure 5:
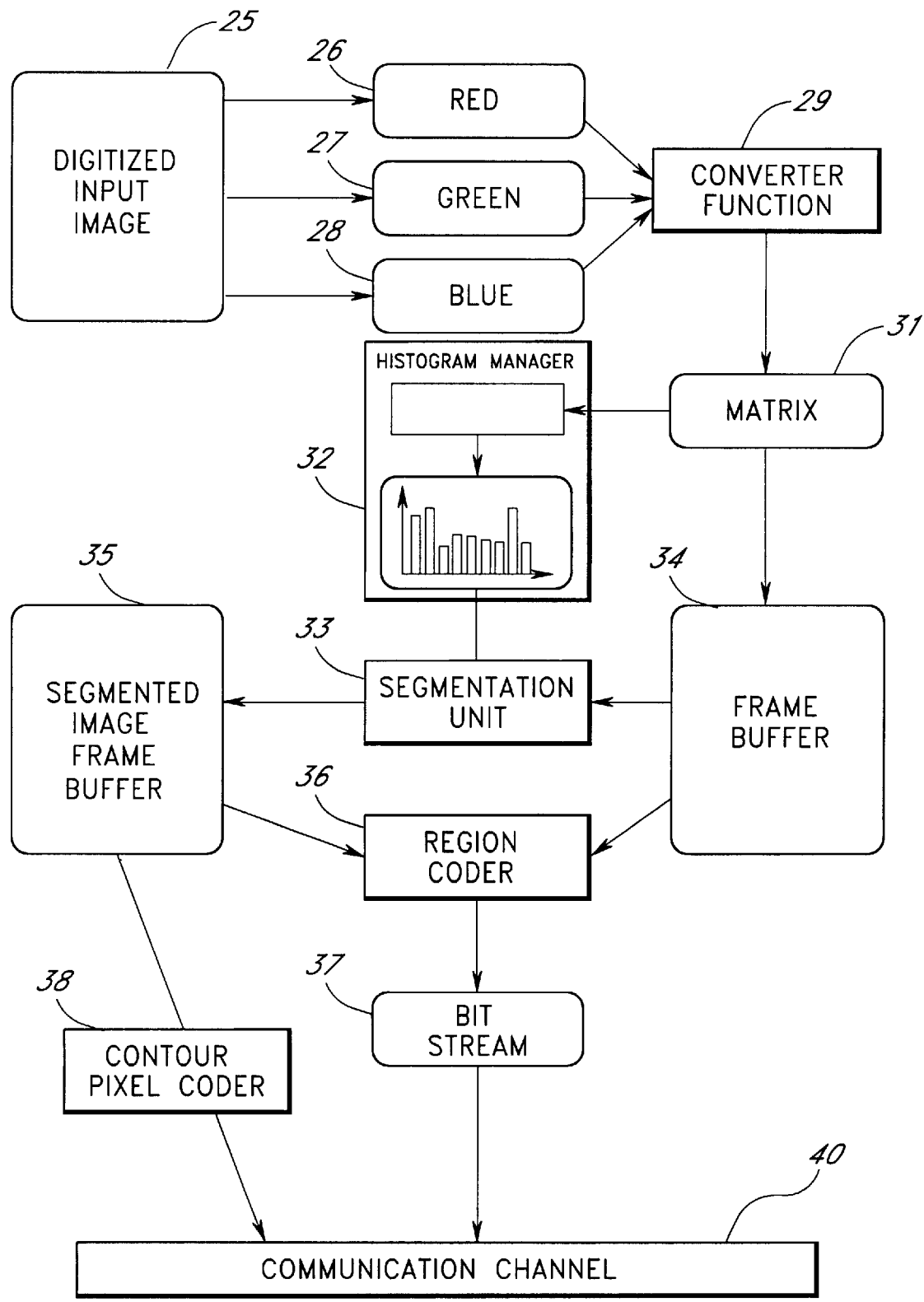
FIG. 5 shows a first embodiment of the ROC scheme in accordance with the present invention.

FIG. 5 shows a Hilbert fractal-based ROC scheme 30 as a preferred embodiment of the present invention. The digitized input image 25 is analyzed pixel by pixel. The color coordinates 26–28 of each pixel $A_{XY}$ are converted into a length $L_{Hilbert}^{XY}$ in color space by a converter function 29 and output in a matrix 31 as a length $L_{Hilbert}^{XY}$ on a pixel by pixel basis. Each length $L_{Hilbert}^{XY}$ corresponding to a pixel $A_{XY}$ is fed to a histogram manager 32, which keeps the histogram of the current image up to date and stores it, and to the frame buffer 34 in which the image is stored as a matrix, with each pixel defined not by its color but by its $L_{Hilbert}$ value. Peano scan histograms are described in "Manipulation and presentation..." The $L_{HiLbert}^{XY}$ matrix 31 can be computed by the function 29 in an iterative way, three bits at a time as described in "Space filling curves: Their Generation and Their Application to Bandwidth reduction", IEEE Transactions on Information Theory, vol. IT-15, pages 658 to 665, Nov., 1969 which is incorporated herein by reference. One iteration step operates on one bit of each color component at the same resolution level k (bit position): k=0 corresponds to the coarsest resolution level, k=b−1 corresponds to the highest resolution level. The generating formulae are:

$$\overline{Y}_k = G[\overline{T}_k * \overline{X}_k]$$

$$\overline{T}_k = \overline{T}_{new}(\overline{Y}_{k-1})\overline{T}_{k-1}$$

with:

$\overline{X}_k$ representing the input vector for the resolution level k $\overline{T}$ representing the transform matrix $G$ representing the bit mapping transform $\overline{Y}$ representing the output vector for the resolution level k $\overline{T}_k * \overline{X}$ is defined as follows:

$$Z_i = \sum_{j=0}^{2} t_{ij} \odot x_{ij}, Z_i \in \overline{T} * \overline{X}$$

$$t_{ij} = 1 \rightarrow t_{ij} \odot x_j = x_j$$
$$t_{ij} = 0 \rightarrow t_{ij} \odot x_j = 0$$
$$t_{ij} = -1 \rightarrow t_{ij} \odot x_j = 1 - x_j$$

$\overline{X}^k$ is a three bit vector consisting of one bit of each color component at the resolution k. The iterative generation process is started at the coarsest detail level (most significant bit of the color components), yielding $\overline{Y}_o$, the three most significant bits of $L_{Hilbert}$. $\overline{T}_0$ is the identity matrix, $\overline{T}_{new}$ is computed from $\overline{Y}_0$ so that $\overline{T}_1$ is known. The three bits of the next resolution level are processed until the required resolution is reached.

Analogous formulas are used for the inverse transform used in decoding.

Figure 6:
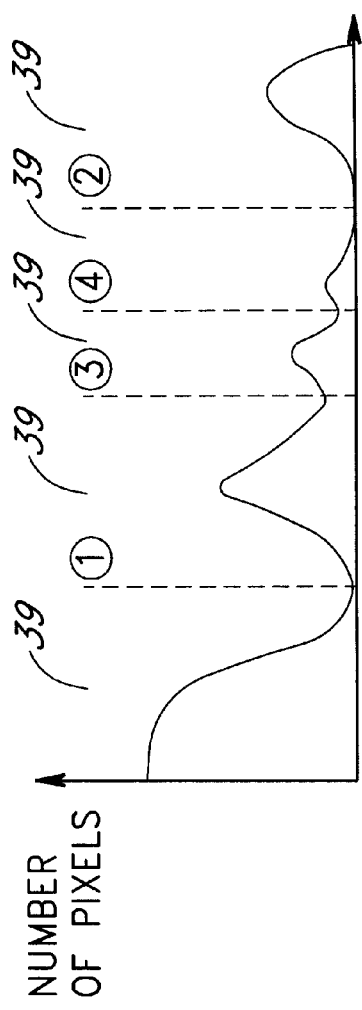
FIG. 6 shows a histogram segmented into bins in accordance with the present invention.

Once the histogram is computed, an adaptive histogram multi-threshold technique may be used to divide the histogram into segments or bins 39 as shown in FIG. 6. As an example of such a technique, the minima in the histogram are determined and the boundaries set at these points as shown in FIG. 6. If the number of groups or bins 39 thus formed is less than or equal to a predetermined value, these bins 39 are accepted. If there are too many bins 39, the less important bins 39 are merged. For instance, the bin 39 (in FIG. 6 this would be the bin between dashed boundaries 2 and 4) with the smallest number of entries in the bin is merged to its neighbor thus reducing the number of bins 39. This procedure is repeated until the required number has been reached. Other criteria for merging may be used as are known to the skilled person.

The segmentation scheme performed by the segmentation unit 33 (FIG. 5) in accordance with the present invention requires at least two memories: the LHilbwrt input frame buffer 34 (FIG. 5) and the histogram memory of the histogram manager 32 in the histogram manager 32. The $L_{Hilbert}$ input frame buffer 34 has the same dimensions as the image dimensions (N×M), and each pixel requires three times the number of bits used for input color components (typically 3×8) if used in reversible applications, e.g., ROC, or less if used in non-reversible applications, e.g., preprocessing for object recognition. The number of bins 39 in the histogram depends on the application and is related to the maximum resolution the scheme has to achieve. It can be kept low thanks to the clustering properties of the Hilbert fractal transform, resulting in low memory requirements for the histogram. Experiments have shown that the number of bins 39 required for ROC is typically $$\sqrt{\frac{N}{C}} \times \sqrt{\frac{M}{C}},$$

where C is a constant which may be decided arbitrarily depending upon the application and may be 1,2,4, etc. and is typically 4. The word length (=number of bits) required for each bin equals : $\log_2$ (N×M). When using 256×256 images, the histogram memory in the histogram manager 32 requires between 1 and 4 Kbits. For ROC, an additional 1 bit, N×M frame buffer is needed to store the L segmented image.

The bins 39 in the histogram shown in FIG. 6 are divided into G groups that are separated by G−1 edges. In FIG. 6 the bins are shown as a continuous histogram distribution, the boundaries between the bins are labelled 1 to 4. Using the boundaries 1 to 4 between the bins 39, the data in the frame buffer 34 is converted into the segmented image and stored in the frame buffer 35 using the segmenting unit 33.

Figure 7:
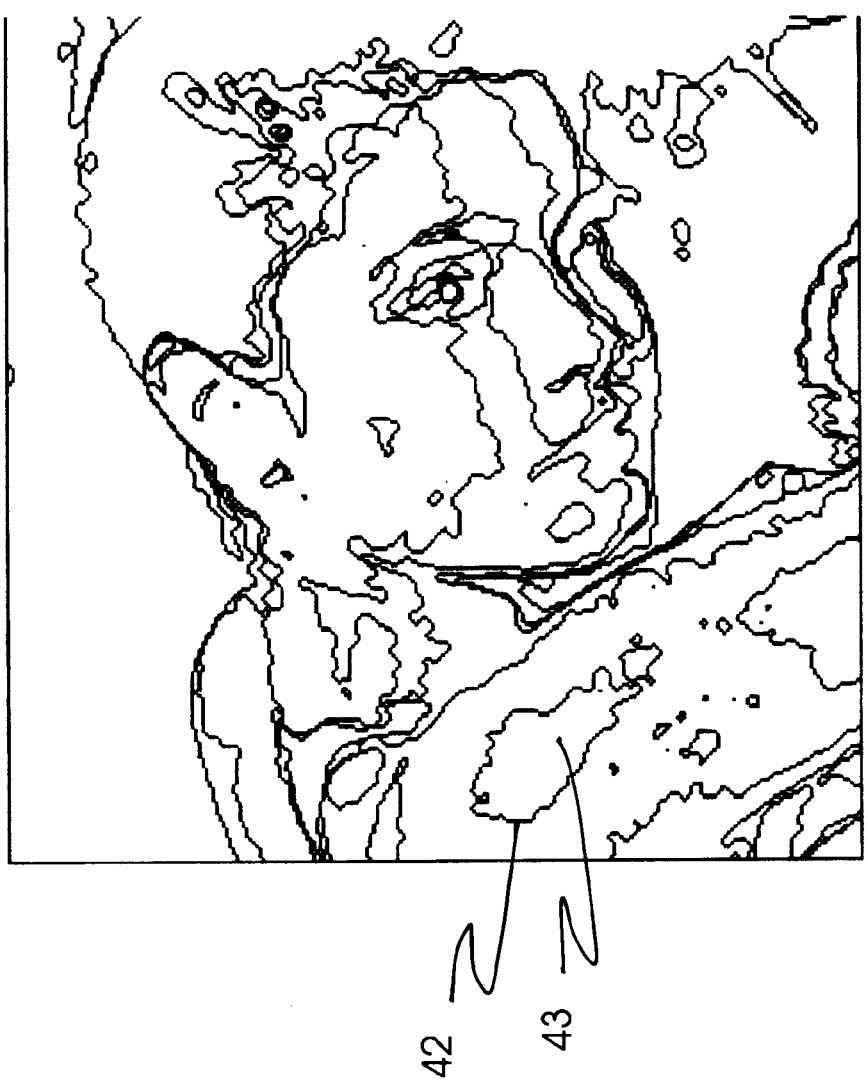
FIG. 7 shows a segmented image (shown here to correspond with the head image of FIG. 1A) in accordance with the present invention.

A segmented image in accordance with the present invention is shown in FIG. 7. The exemplary image 35 corresponds to the original image of a person's head when lying down previously shown in FIG. 1A. The segmented image contains only the contour pixels of the regions, e.g., the contours 42 are black and the regions 43 are white. The contours are defined by adjacent pixels in the image which lie in two different bins 39 of the histogram. The segmented image in accordance with the present invention shown in FIG. 7 was produced using 10 bins. The segmented image may be output to a communication channel 40 via a contour pixel coder 38. This coder may code the contour pixels in accordance with any conventional technique, for instance as described in U.S. Pat. No. 5,459, 513, or "Region Image Coding," D. Moran, T. Vlaches, and A. G. Constantinides, presented at the IEE colloquium on Low Bit Rate Image Coding, London, May 1990 or similar methods already mentioned above.

The segmented image stored in frame buffer 35 may be sufficient for pattern recognition purposes. However, for reproduction of a color image, the data from segmented image is supplied to a region coder 36 configured as an arithmetical unit. This coder 36 takes the data from the frame buffer 34 for each region and calculates the appropriate representative color to assign to this region. The representative color for a region may be determined by a statistical manipulation of the values of the elements of frame buffer 34 in the particular region. For, instance an average value or a median value may be calculated. Alternatively and preferably, an analysis may be performed to determine the most commonly occurring color in the region. Alternatively, the representative color may be calculated by minimizing the root mean square of the differences between the value of each element in the region and the representative value or any other appropriate averaging technique may be applied.

In accordance with the present invention the determination of the color to be assigned to each region is determined from the color data in that region rather than assigning an average color value to a bin 39 (FIG. 6). In accordance with the present invention the colors of regions belonging to the same bin 39 may have differing colors. Thus, for instance, a particular bin 39 may have an average color brown with extremes of dark brown and light brown within the same bin. A region whose contours have been determined by the boundary between this bin and the next bin which is, say, red, may be assigned any color between dark brown and light brown depending upon the dominant color in the region. This has a profound effect on color fidelity. Where an image contains many small regions, each region in accordance with the present invention has a degree of independence. For instance, in the example given above with r=250, the number of bins may be as low as 5 or 6. Thus on average there are about 50 regions for each bin. Each of these regions has color independence within its bin. The final compressed image has a color quality as if it has been segmented with more regions than has actually been the case.

Alternatively, sets of data may be used as the representative values. This may allow some hue variation within a region. For instance, using techniques such as Fast Fourier Transforms (FFT), DCT or special techniques as described in the thesis "Vervormde Polynomen voor de Compressie van Een- en Tweedimensional Signalen", by Wilfred Philips, University of Ghent, Belgium, 1992–1993, the color variations in the data in each region may be approximated by a polynomial, whereby only the coefficients of the polynomial need to be output. To reduce the number of bits required, the coefficients may be quantized and insignificant coefficients discarded. Alternatively, the variations of color within one region may be approximated by the conventional technique of color dithering. The data relating to the representative color values or sets of values of the elements in the regions is output to the communication channel 40 as a bit stream 37. The decoder in accordance with the present invention performs the reverse operation whereby the input data including the coded contour pixel data is first decoded and stored in a frame buffer 35 and the region color data is used to create the $L_{Hilbert}$ image, stored in a frame buffer 34 and transformed into a color image via a 1-D to 3-D transform.

A test image of a portrait coded with 7 bins in accordance with the present invention having a compression ratio of 130:1 was compared with the same image compressed by DCT and BOC having the compression ratio of 108:1. Whereas the portrait was recognizable with the compression scheme of the present invention, BOC and DCT resulted in a meaningless picture at this compression level. The original image required a total of 192 Kbytes whereas the compressed image in accordance with the present invention required 1508 bytes.

The segmentation function of FIG. 5 alone introduces no latency, uses no local memory, and thus does not require memory accesses, nor address generation. The price which has to be paid is the use of the histogram manager (FIG. 5) and 3-D to 1-D converters 29. The latency introduced by the complete ROC scheme is two frames. The required storage equals one 24-bit frame 34 for the 1-D image, one 1-bit frame 35 for the segmented image, and the histogram memory in the histogram manager 32. In these considerations the latency introduced by the region coding and the storage required by the region coder have been ignored, since they depend on the selected coding technique.

Figure 8:
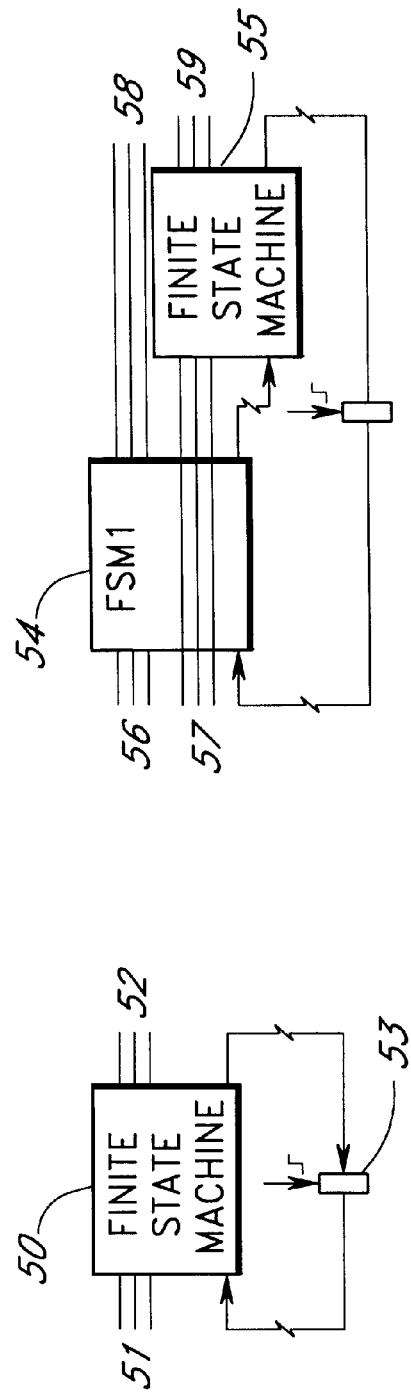

The ROC scheme in accordance with the present invention may be implemented in software or may be hardware, e.g., in a VLSI-Implementation. Referring to FIG. 8, the $L_{Hilbert}$ generating formulae can be modelled as a Finite State Machine (FSM) 50 with one bit of each color component $\overline{X}_k$ at resolution level k as input 51, resulting in output 52, $\overline{Y}_k$ having three successive output bits and an internal state 53. The FSM can be considered a hardware implementation of the 3-D to 1-D Hilbert converter 29 (FIG. 5) and provides an iterative way of obtaining distance. Computation using this technique requires eight clock cycles. The pixel rate is thus eight times less than the clock frequency of the circuit.

Figure 9:
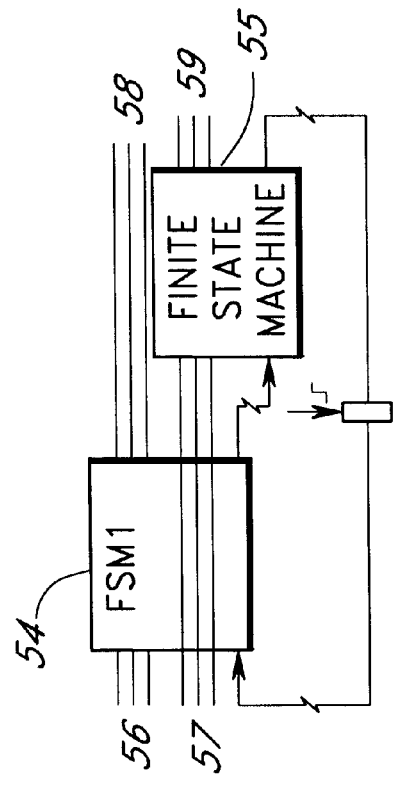
FIGS. 8 and 9 show schematic diagrams of finite state machines as used in accordance with the present invention.

Referring to FIG. 9, a higher pixel rate can be achieved by chaining different FSM's 54, 55. The input 56 to the first FSM 54 is $\overline{X}_k$, with an output 58 of $\overline{Y}_{k-1}$. In the second FSM 55, the input 57 is $\overline{X}_k$ and the output 59 is $\overline{Y}_k$. A bit level pipelining of this chain can be considered, which introduces latency but preserves the high pixel rate.

The Hilbert converter in accordance with the present invention has been implemented in 0.7 $\mu$m double metal CMOS technology. The design includes 1942 equivalent NAND gates, resulting in a silicon area of 1.7 mm$^2$. For true color (24 bit) applications, pixel rates up to 27 MHz have been obtained.

A second embodiment 60 of the present invention will be described with reference to FIGS. 6 and 10. The bins 39 in the histogram shown in FIG. 6 are divided into G groups that are separated by G–1 edges. In FIG. 6 the bins are shown as a continuous histogram distribution, the boundaries between the bins are labelled 1 to 4 in accordance with their introduction. Using the boundaries between the bins 39, the data resulting from the 3-D to 1-D conversion is converted into the segmented image stored in frame buffer 35 by the segmenting unit 33. The contour pixels are those which lie adjacent to a pixel in another bin 39. These G bins 39 correspond to at least G regions in the segmented image. For each bin 39 there may be many regions. On increasing the number of bins G, the details of the regions will be refined. If precaution is taken to only place new boundaries in the histogram, without changing the location of previously placed boundaries, only new regions will appear in the segmented image when increasing G. When G is decreased, first regions coinciding with the finest details will be merged into the larger background region.

The images resulting from a segmentation with G and G–1 bins 39 in the histogram have a common subset of regions. This means that a tree-like hierarchical segmentation is performed, with every region being the root for the next resolution level k. A gradual and consistent detail level increase or decrease is hence made possible.

Figure 10:
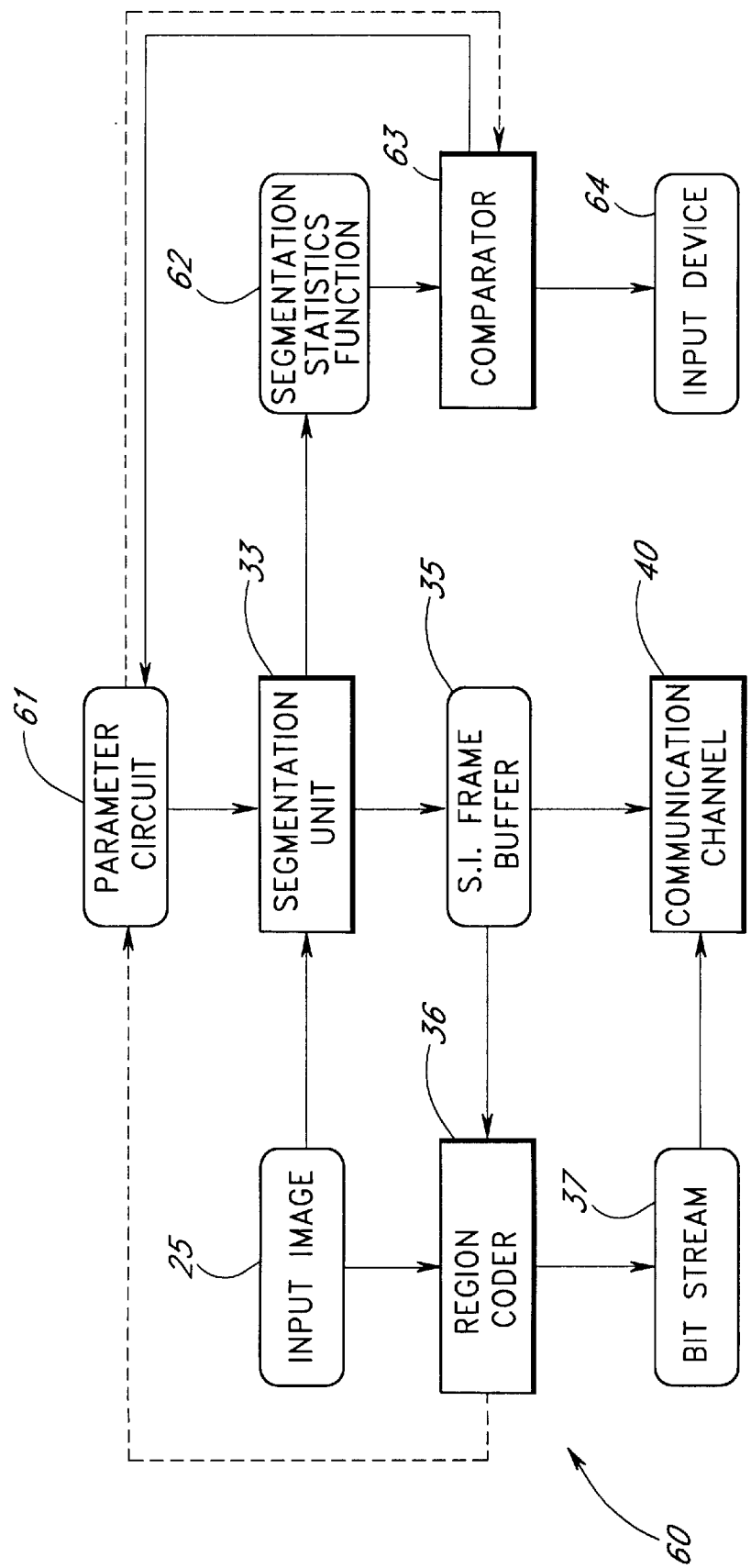
FIG. 10 is a block diagram of an ROC scheme in accordance with a second embodiment of the present invention.

In FIG. 10, the same reference numerals have been used for the same functional items as in FIG. 5. As described in conjunction with FIG. 5, this second embodiment 60 includes the input image 25, the segmentation unit 33, the segmented image frame buffer 35, the region coder 36, bit stream 37, and the communication channel 40. The first segmented image stored in a frame buffer 35 is produced using the method in accordance with the present invention from the input image 25 based on default values for the determination of the number G of bins 39. Segmentation statistics, e.g., number of regions, number of contour pixels, are extracted in a statistics function 62 and compared in a comparator 63 with the required or maximum/minimum compression level, which may be input from an input device 64. As the number of contours is largely dependent on the number of regions, this data may optionally be input to the comparator 63 from the region coder 36. If the compression ratio is too high, the parameters for the segmentation may be changed by a parameter circuit 61, e.g., reduction in the number of bins 39, and a new iteration triggered. The parameter circuit 61 uses feedback to implement region-oriented compression. Operation of circuit 61 is shown in a portion of the steps of FIG. 12.

In accordance with the second embodiment, the compression ratio can be maintained over a certain minimum. This is advantageous in the transmission of video or still images when the transmission bit rate is limited, e.g., for video conferences over conventional telephone lines. By adapting the segmentation it is possible to control the bit rate at the loss of some definition.

A modification of the apparatus in accordance with the second embodiment may be used for person or pattern recognition. If the person may be recognized at a low level of resolution k, the recognition procedure is terminated immediately. If, however, there is doubt as to recognition, the resolution level may be increased manually by setting the number of bins through circuit 61 and the image becomes more detailed. Long times are, thus, only required when recognition is difficult.

As a further modification, the invention may be implemented in software and used by object linking with computer based word processing systems. In such an implementation the segmentation of the histogram could be done by the operator until a satisfying result is obtained.

Figure 11:
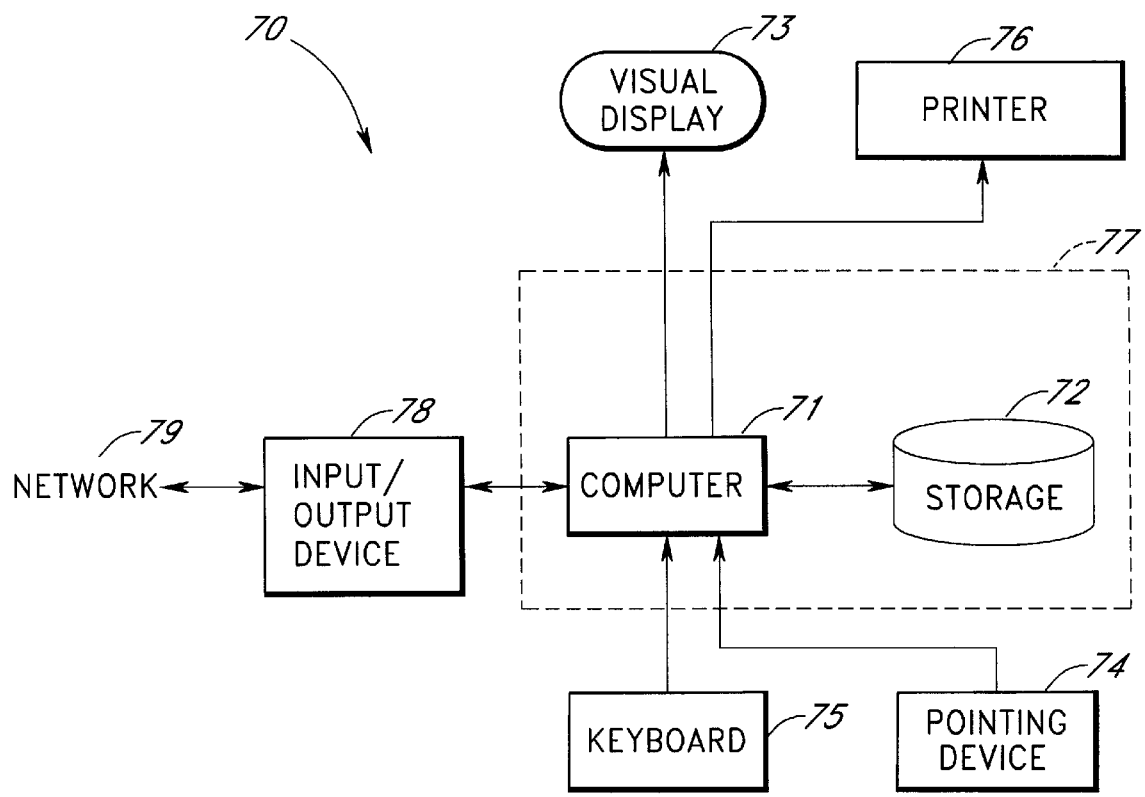
FIG. 11 is a block diagram of a computer system in accordance with the present invention.

FIG. 11 illustrates a computer work station generally indicated at 70 which is representative of the type of computer that is used with the present invention. The workstation 70 comprises a computer 71, a hard disk drive 72, a color monitor 73, a mouse 74, a keyboard 75, and a printer 76. In the presently preferred embodiment, the visual display unit 73 is a 15 inch color monitor having a 1024×768 pixel resolution. The mouse or other pointing device 74 is used among others things to "pick" an image entity. The hard disk drive or other mass storage 72, in one possible configuration of the workstation 70 stores 1 gigabyte of data.

The fundamental processing components of the computer 71 are a microprocessor such as, for example, a Pentium processor manufactured by Intel and a main memory comprising, for example, 16 megabytes of random access memory (RAM). The RAM in preferably configured as a video ram, e.g., a dual port memory. The RAM is preferably used to temporarily store the segmented image data, the histogram, and the ID image of $L_{Hilbert}$. The main memory is used to store certain software including the operating system and drivers for the hardware as well as the encoding/decoding software written in the C language and using a C compiler available from Microsoft Corporation. The encoding/decoding software includes the 3-D to 1-D converter, a histogram manager, the image segmentation routine and the region coding routine. Computer 71 may also include input/output devices 78 for communication with a network or communication system 79 such as the Internet. The computer 71 and storage 72 are preferably located in an enclosure 77.

Although a representative workstation has been shown and described, one skilled in the applicable technology will understand that many other computer and workstation configurations are available to support the present invention.

Figure 12:
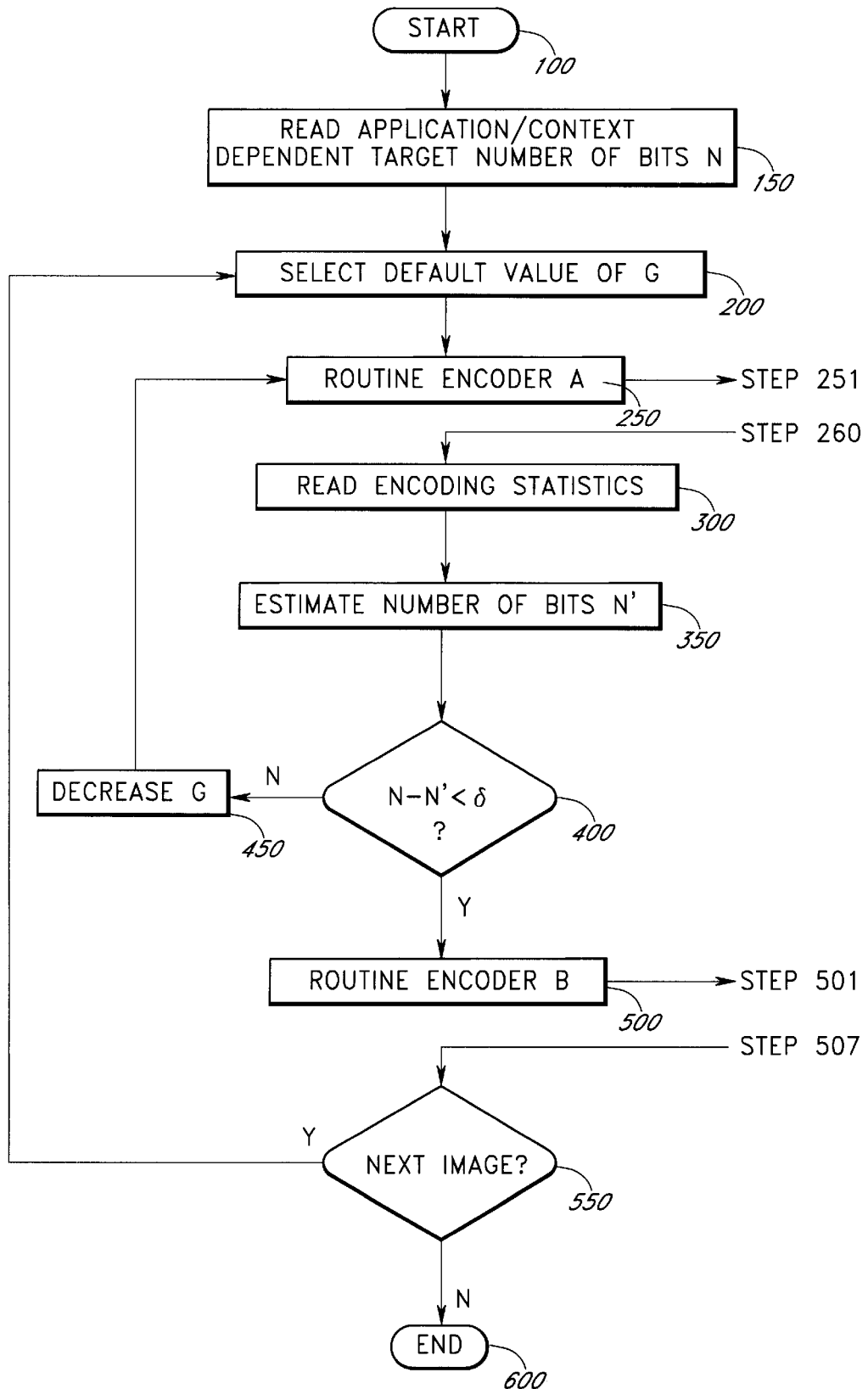
FIG. 12 to 17 show flow diagrams of the method of the second embodiment of the present invention.

FIGS. 12 to 17 show flow diagrams of the method in accordance with the second embodiment of the present invention. Referring to FIG. 12, the compression routine starts with step 100. Step 150 includes reading the parameters and limits for the application, e.g., the maximum number of bits allowed for the final image. In step 200, the default value of bins (G) for the histogram is selected, e.g., the previous value is taken or a set value. Step 250 includes first encoding routine A, which includes steps 251 to 260.

Figure 13:
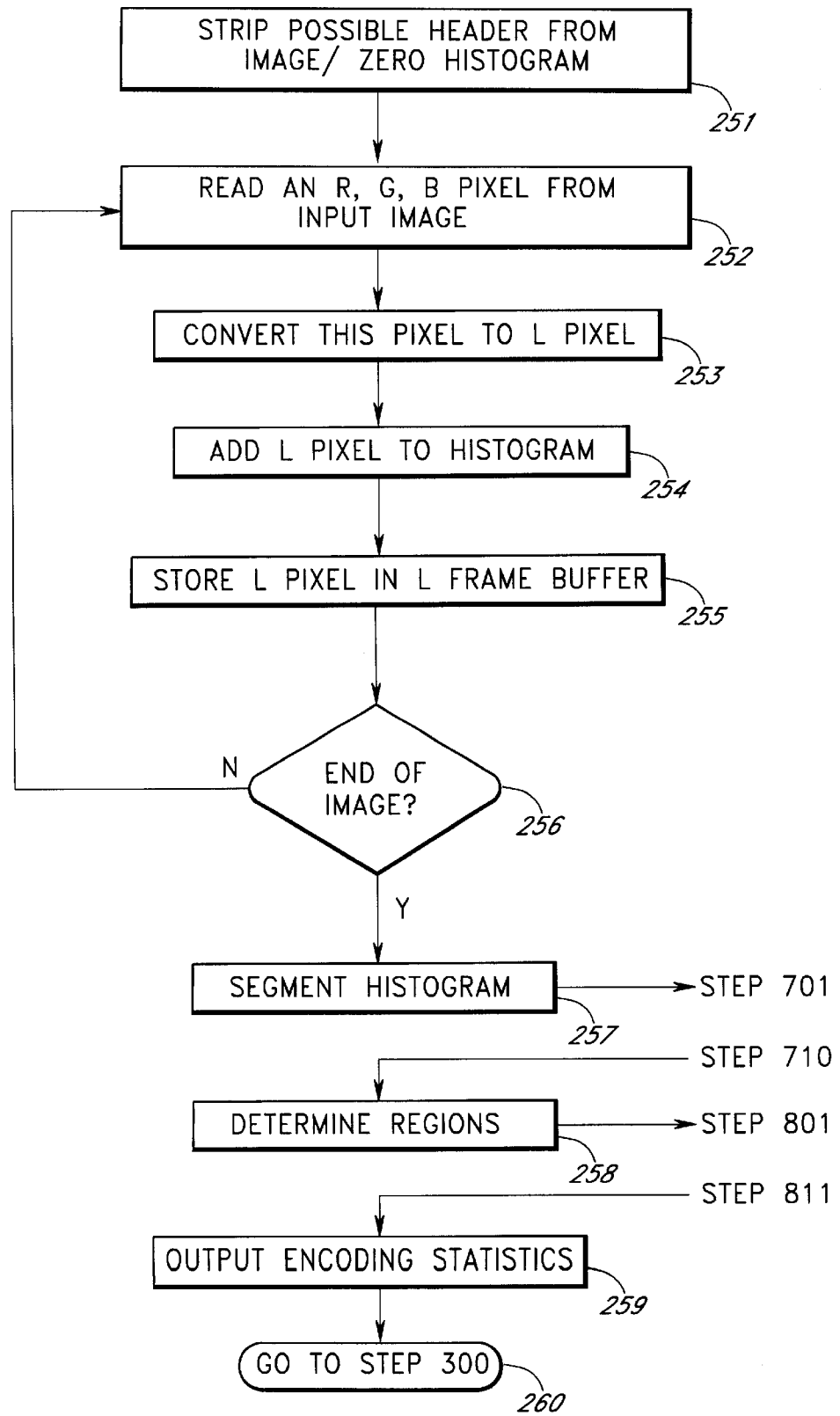

Referring to FIG. 13, with step 251 the image data is read in and prepared for processing, e.g., removing headers and the histogram is zeroed. In step 252 one of the pixels of image data is read in and converted in step 253 from the color space defined by the color components of the pixel into a distance L in color space determined by the Hilbert fractal scan. In step 254, the histogram is updated with the new value of $L_{Hilbert}$. In step 255, this new distance $L_{Hilbert}$ is then added into the frame buffer (34 of FIG. 5) storing the representation of the image described by $L_{Hilbert}$ values. In step 256 it is determined if the image has been completely scanned. If not, the steps 252 to 256 are repeated for the next pixel. Once the image data has been completely read in, the histogram is complete and so is the $L_{Hilbert}$ image in the frame buffer 34. In step 257, the histogram is segmented into bins in steps 701 to 710 shown in FIG. 15.

Figure 15:
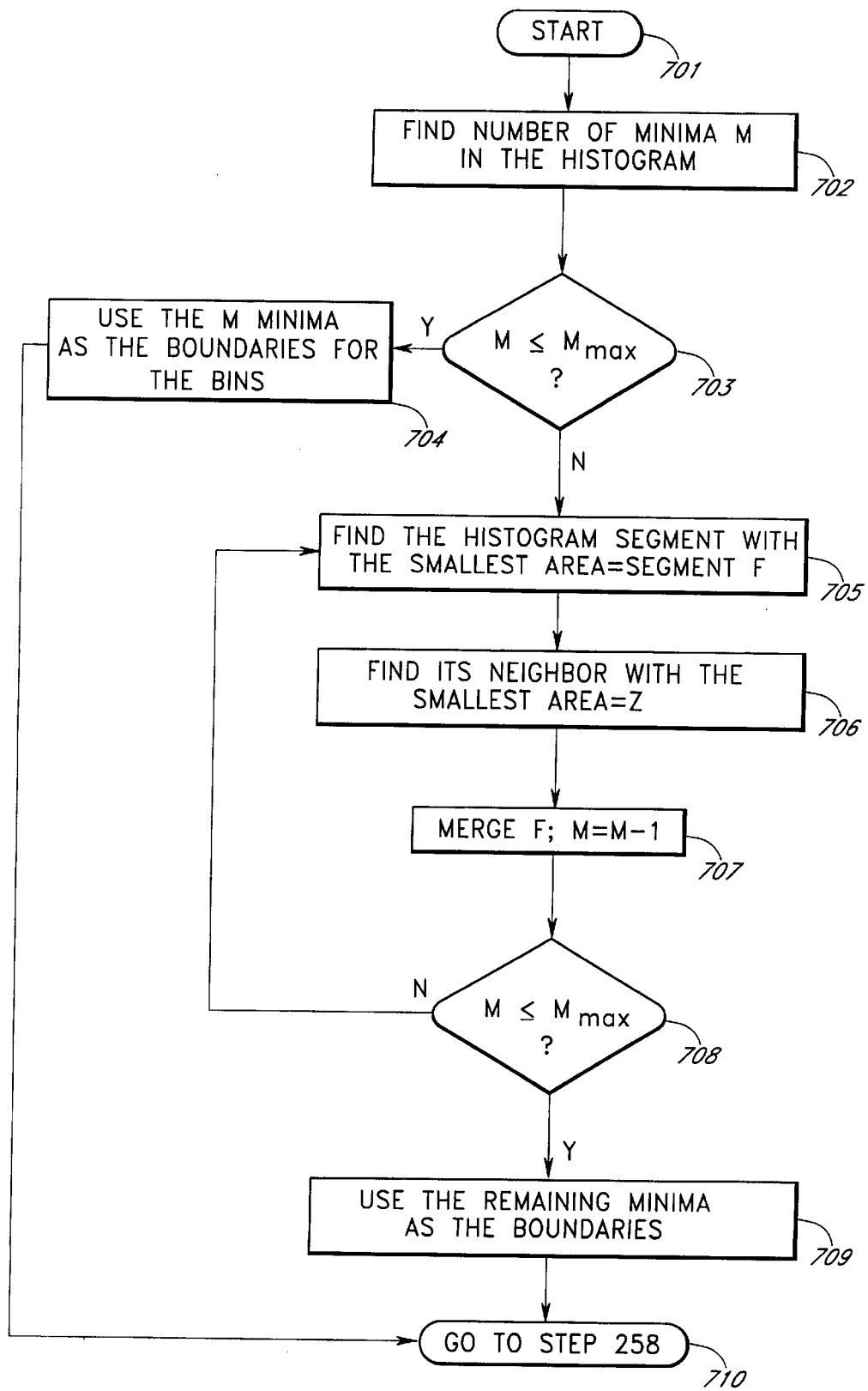

Referring to FIG. 15, the histogram segmentation routine is started at step 701. In step 702, the minima in the profile of the histogram are determined. In step 703, the number of minima found, M, is compared with the maximum number of bins allowed, $M_{max}$. If M exceeds $M_{max}$, the smallest histogram segment F is determined in step 705. In step 706, the two neighbors of segment F are compared, and the smallest segment Z of the two is determined. In step 707, segments Z and F are merged thus reducing the number of segments to M−1 (new M). In step 708, the new M is compared with $M_{max}$. and steps 705 to 708 repeated if the new M still exceeds $M_{max}$. If the new M is less than or equal to $M_{max}$, the boundaries determined by the minima are taken as the boundaries of the bins in the histogram at step 709. The routine returns at step 710 to step 258 of FIG. 13. At step 258 (FIG. 13), the bins are used to segment the $L_{Hilbert}$ image stored in the frame buffer as shown in steps 801 to 811, FIG. 16.

Figure 16:
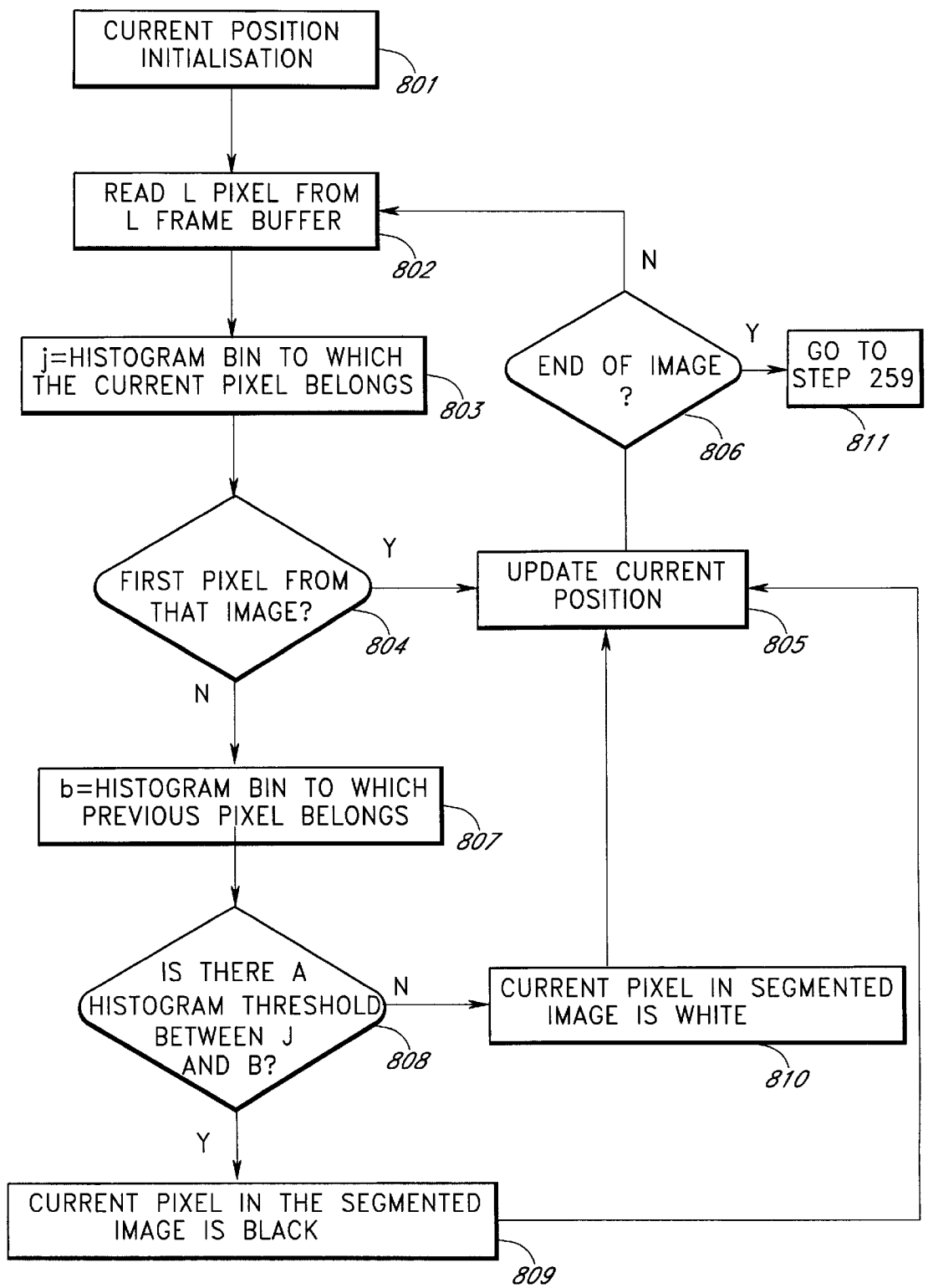

Referring to FIG. 16, the routine is initialized at step 801. In step 802, a pixel of data is read from the $L_{Hilbert}$ image in the frame buffer 34. In step 803, the bin j of the histogram to which the particular value of $L_{Hilbert}$ belongs is determined. In step 804, it is determined if this pixel is the first pixel in the image. If yes, the histogram is simply updated in step 805 and steps 802 through 804 are repeated. If the pixel is not the first pixel, the bin j for the current pixel is compared with the bin b of the previous pixel in step 807. If b does not equal j, these two pixels lie on a contour of a region. This is determined in step 808. The contour pixel is coded with a color, e.g., white and the segmented image in a second frame buffer (35 in FIGS. 5 and 10) is updated in step 810. In step 806, it is determined if the image is complete. If not complete, steps 802 to 806 are repeated. If j equals b in step 808, the current and previous pixels are in the same bin. In this case, the current pixel is coded black at step 809, and the segmented image in the second frame buffer is updated in step 805. If in step 806 the end of the image is determined, the routine returns at step 811 to step 259 of FIG. 13. Referring again to FIG. 13, at step 259, the encoding statistics (e.g., number of regions, number of contour pixels) are determined and the routine returns at step 260 to step 300.

Referring again to FIG. 12, the most important number is the estimation of the number of bits N' required to transmit the image which is determined in step 350 from the encoding statistics. N' is compared with the target value of N in step 400. If N' is greater than N by a value exceeding a tolerance δ, the segmentation routine must be restarted in step 250 with a value of the number G of bins in the histogram reduced by one in step 450. If N' is close to N, the encoding may proceed with the routine encoding B in step 500.

Figure 14:
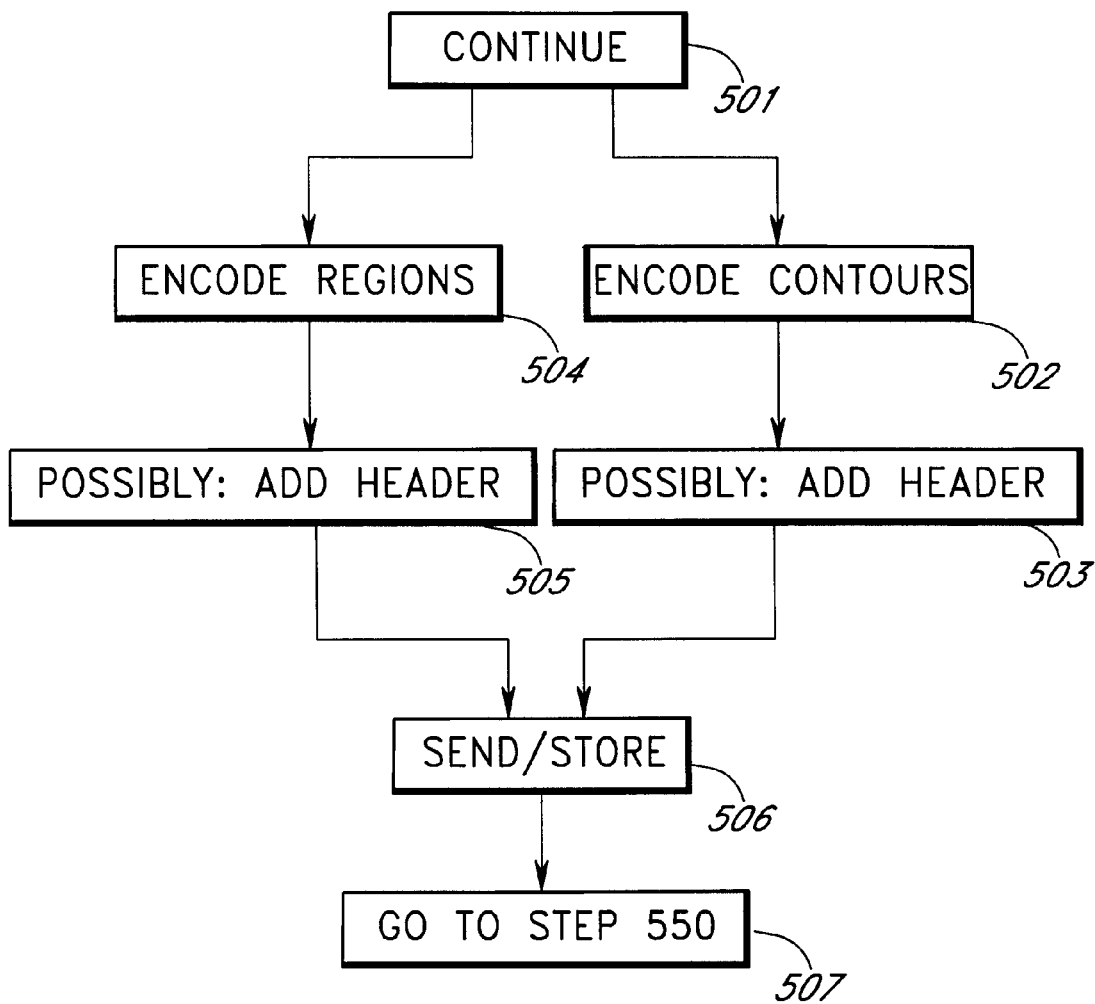

Referring to FIG. 14, routine encoding B steps 501 to 507 are the steps in which the segmented image with its contour pixels, regions and representative values for the pixels are output to a memory, to a network, etc. In step 502, the contour pixels are coded. It is wasteful of bits to output each individual pixel. It is more economical to specify only the direction of how to get from one contour pixel to the next contour pixel. Further, it is wasteful to specify the boundaries between two regions twice, one for each region. Conventional contour pixel coding schemes provide optimal compression of the contour pixel data. In step 503, a header may be added, e.g., to specify an address on the Internet. In step 504, the region data is coded. The region data is the set of representative data which determines the color of each pixel in a specific region. This data may be output as $L_{Hilbert}$ data or, alternatively, the $L_{Hilbert}$ values in the segmented image may be output as color components, e.g., RGB or CMY values by conversion. The set of representative values may be a single value, e.g., the average for the region or the most common color in the region. Alternatively, a polynomial may be fitted to the pixel data in each region, and the coefficients of the polynomial are then output. DCT and FF transforms may be used in a similar way. In step 505, a header may be added, and in step 506, the coded region data is output with the coded contour pixel data as a bit stream to a memory or to a communication channel. The routine is now complete and returns at step 507 to step 550 of FIG. 12 to determine if a new image is to be processed, e.g., if the images are video frames. If there is no image, the routine ends in step 600.

Figure 17:
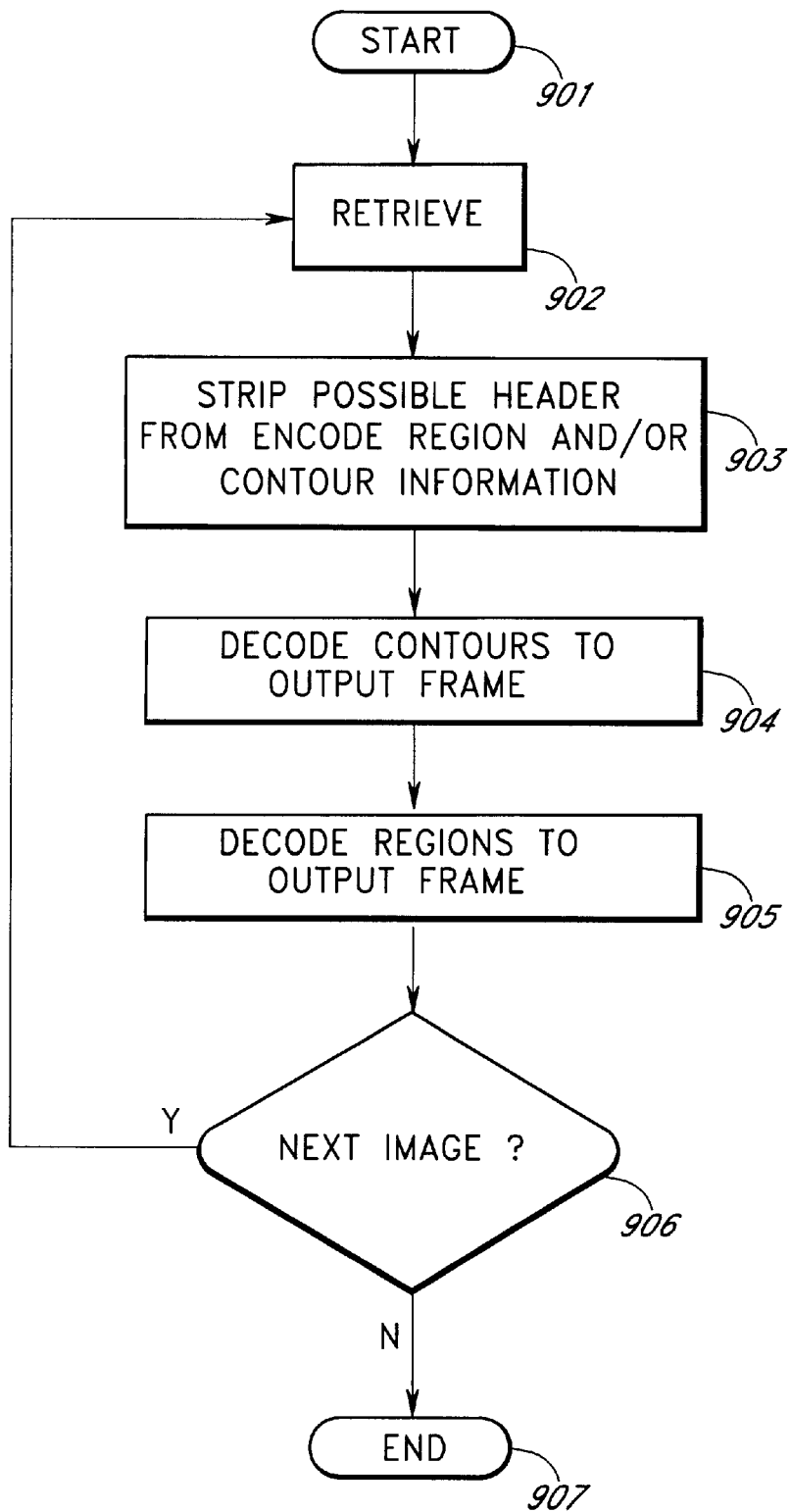

On the receiving end of the coded data, the image must be reconstructed by decoding, the flow diagram of which is shown in FIG. 17. In step 901, the decoding routine is started. In step 902, the data is retrieved, e.g., from a communication channel such as the Internet. In step 903, superfluous data, such as headers is stripped away. In step 904 the coded contour pixel data is decoded using the reverse routine for coding to determine the contour pixels of the image to be stored in an output frame buffer. In step 905, the region data is decoded. This involves decoded the set of representative values into color components of each pixel. Where the region data has been transmitted as $L_{Hilbert}$, values, each $L_{Hilbert}$ value must be converted into color components by a 1-D to 3-D conversion in color space, i.e., the reverse of the coding routine. The final result is an image in the output buffer which is segmented into regions and the region pixels have been assigned values from the representative set of values for that region.

The present invention may be particularly useful for the compression of synthetic or artificial images, e.g., maps with color coded height contours, roads, marine charts, etc. or cartoon videos. The invention may also find use in video conferencing as high compression can be obtained without motion compensation, pattern/person recognition as well as browsing on the Internet.

The segmentation and compression routine in accordance with the present invention may be used to provide video object planes in a multimedia environment. In particular, the present invention may find application in MPEG4 environments (see drafts of ISO/IEC JTC1/SC29/WG11, publications N0998, July 1995; N1028, November 1995, to N1184, January, 1996, and N1185, March 1996).

While the above detailed description has shown, described, and pointed out the fundamental novel features of the invention as applied to various embodiments, it will be understood that various omissions and substitutions and changes in the form and details of the system illustrated may be made by those skilled in the art without departing from the spirit of the invention.

What is claimed is:

1. A method of compressing digital data comprising the steps of:

step a) inputting a first matrix of elements, a value of each element of the first matrix being represented by a set of a plurality of "S" intensity values corresponding to "S" quantized levels of a characteristic of each element, each set of intensity values associated with an element in the first matrix being representable by a coordinate of a point in an "S" dimensional space, the "S" dimensional space having axes representing the intensity of the "S" quantized levels of the characteristic as variables;

step b) determining an occurrence matrix ($O_{L1}$, . . . $O_{LN}$ . . . $O_{LW}$) on an element-by-element basis for the elements in the first matrix, the position of an element in said occurrence matrix ($O_{L1}$, . . . $O_{LN}$ . . . $O_{LW}$) being determined by the distance from the origin in the "S" dimensional space to the coordinate of the point in the "S" dimensional space represented by the set of intensity values for that element as determined by a step-wise space filling curve passing uniquely through each coordinate of the S-dimensional space; and a value of an element ($OL_N$) of the occurrence matrix ($O_{L1}$, . . . $O_{LN}$ . . . $O_{LW}$) being the number of times that a coordinate in "S" space represented by the set of intensity values of an element of the first matrix has a particular distance $L_N$ from the origin of the "S" space as determined by the step-wise space filling curve; and storing the occurrence matrix ($O_{L1}$, . . . $O_{LN}$ . . . $O_{LW}$), step c) replacing each element of the first matrix by the distance from the origin in the s-dimensional space to the coordinate in the S-dimensional space representing the set of intensity values associated with that element to form a second matrix, and storing the second matrix, step d) segmenting the occurrence matrix ($O_{L1}$, . . . $O_{LN}$ . . . $O_{LW}$) into a variable finite number "P" of occurrence segments, and step e) determining contour elements of first regions in said second matrix, the contour elements of said first regions being determined by segmenting the second matrix into said first regions using the occurrence segments of the occurrence matrix ($O_{L1}$, . . . $O_{LN}$ . . . $O_{LW}$) the distance values in the S-dimensional space of each element of the second matrix in one first region of the second matrix falling into one of the "P" occurrence segments.

2. A method of decompressing digital data, comprising the steps of:

step a) receiving digital data representing the contour elements of regions in a first matrix and first characteristic data relating to a characteristic of elements in each region of said first matrix each first characteristic data associated with an element in the first matrix representing the distance from the origin in an "S" dimensional space to a coordinate of a point in the "S" dimensional space represented by a set of intensity values for that element as determined by a step-wise space filling curve passing uniquely through each coordinate of the S-dimensional space and a value of an element ($OL_N$) of an occurrence matrix ($O_{L1}, \ldots O_{LN} \ldots O_{LW}$) being the number of times that a coordinate in the "S" dimensional space represented by the set of intensity values of an element of the first matrix has a particular distance $L_N$ from the origin of the "S" dimensional space as determined by the step-wise space filling curve;

step b) decoding said digital data to form said first matrix, and step c) replacing the first characteristic data of each element in each region of the first matrix by a set of a plurality of "S" intensity values corresponding to "S" quantized levels of a second characteristic of each element to form a second matrix, each set of intensity values associated with an element in the second matrix being represented by a coordinate of a point in an "S" dimensional space, the "S" dimensional space having axes representing the intensity of the "S" quantized levels of the second characteristic as variables, the coordinates of the point representing the plurality of "S" intensity values corresponding to the "S" quantized levels of the second characteristic.

3. The method of claim 1, further comprising the step of:

f) storing the contour elements as a third matrix, said contour elements defining second regions in said third matrix corresponding to first regions in said second matrix; and g) coding the elements of one second region of the third matrix with a representative set of values for the elements of said one second region, each representative value being a distance from the origin in the S-dimensional space to a coordinate in the S-dimensional space, the set of representative values being calculated from the distances from the origin in the S-dimensional space to the coordinates in the S-dimensional space associated with the elements in the first region of said second matrix corresponding to the one second region.

4. The method of claim 1, wherein the step-wise space filling curve is one of deterministic or statistical self-similarity.

5. The method of claim 1, wherein the step-wise space filling curve is a fractal.

6. The method of claim 5, wherein the fractal is a Hilbert fractal.

7. The method of claim 3, further comprising the steps of:

comparing segmentation statistics with a value relating to the compression of the first matrix; and repeating steps (d) to (g) with a different finite number "P" of occurrence segments depending upon the results of the comparison.

8. An apparatus for compressing digital data, comprising:

input means for inputting digital data in the form of a first matrix of elements, a value of each element of the first matrix being represented by a set of a plurality of "S" intensity values corresponding to "S" quantized levels of a characteristic of said data, each set of intensity values associated with an element in the first matrix being representable by a coordinate of a point in an "S" dimensional space, the "S" dimensional space having axes representing the intensity of the "S" quantized levels of the characteristic as variables, a converter for determining an occurrence matrix ($O_{L1}, \ldots O_{LN} \ldots O_{LW}$) on an element-by-element basis for the elements in the first matrix, the position of an element in said occurrence matrix ($O_{L1}, \ldots O_{LN} \ldots O_{LW}$) being determined by the distance from the origin in the "S" dimensional space to the coordinate of the point in the "S" dimensional space represented by the set of intensity values for that element as determined by a step-wise space filling curve passing uniquely through each coordinate of the S-dimensional space, and a value of an element ($OL_N$) of the occurrence matrix ($O_{L1}, \ldots O_{LN} \ldots O_{LW}$) being the number of times that the coordinate in "S" space represented by the set of intensity values of elements of the first matrix has a particular distance $L_N$ from the origin of the "S" space as determined by the step-wise space filling curve: and storing the occurrence matrix ($O_{L1}, \ldots O_{LN} \ldots O_{LW}$), a first frame buffer for storing the occurrence matrix ($O_{L1}, \ldots O_{LN} \ldots O_{LW}$), segmentation means for segmenting the occurrence matrix ($O_{L1}, \ldots O_{LN} \ldots O_{LW}$) into a variable finite number "P" of occurrence segments, a second frame buffer for storing a second matrix, the second matrix being formed by replacing each element of the first matrix by the distance from the origin in the S-dimensional space to the coordinate in the S-dimensional space representing the set of intensity values associated with that element;

a segmentation unit for segmenting the second matrix into first regions, the distance values in the S-dimensional space of each element in one first region of the second matrix falling into one of the "P" occurrence segments, and for determining contour elements of said first regions in said second matrix; and a third frame buffer for storing the contour elements of said first regions as second regions in a third matrix.

9. The apparatus of claim 8, further comprising:

means for coding the elements of one second region of the third matrix with a representative set of values for the elements of that second region, each representative value being a distance from the origin in the S-dimensional space to a coordinate in the S-dimensional space, the set of representative values being calculated from the distances from the origin in the S-dimensional space to the coordinates in the S-dimensional space associated with the elements in the first region of the second matrix corresponding to the said one second region in said third matrix.

10. An apparatus for decompressing data, comprising:

means for inputting digital data representing contour elements of regions in a first matrix and first characteristic data relating to a characteristic of elements in each region of said first matrix, each first characteristic data associated with an element in the first matrix representing the distance from the origin in an "S" dimensional space to a coordinate of a point in the "S" dimensional space represented by a set of intensity values for that element as determined by a step-wise space filling curve passing uniquely through each coordinate of the S-dimensional space and a value of an element ($OL_N$) of an occurrence matrix ($O_{L1}, \ldots O_{LN} \ldots O_{LW}$) being the number of times that a coordinate in the "S" dimensional space represented b the set of intensity values of an element of the first matrix has a particular distance $L_N$ from the origin of the "S" dimensional space as determined by the step-wise space filling curve;

means for decoding said digital data to form said first matrix;

a converter for converting said first matrix into a second matrix, said second matrix being formed by replacing the first characteristic data of each element in each region of the first matrix by a set of a plurality of "S" intensity values corresponding to "S" quantized levels of a second characteristic of each element, the "S" dimensional space having axes representing the intensity of the "S" quantized levels of the second characterstic as variables, the coordinates of the point representing the plurality of "S" intensity values corresponding to the "S" quantized levels of the second characteristic; and a frame buffer for storing said second matrix.

11. The apparatus of claim 8, wherein the step-wise space filling curve is one of deterministic or statistical self-similarity.

12. The apparatus of claim 8, wherein the step-wise space filling curve is a fractal.

13. The apparatus of claim 12, wherein the fractal is a Hilbert fractal.

14. The method of claims 1 or 2, wherein the digital data comprises a colored image.

15. The method of claim 14, wherein the colored image comprises a map, chart or plan.

16. A method of compressing data comprising the Steps of:

providing a colored input image;

segmenting the image into a segmented image comprising a plurality of regions defined by contours, wherein the segmenting step comprises the steps of:

scanning the color space of the image based on the representation of each color component being distributed along an image line and based on a space-filling curve to form an occurrence matrix, the position of an element in said occurrence matrix being determined by the distance from the origin to a color coordinate in the color space present in the image, and a value of each element of the occurrence matrix being the number of times that the color coordinates are present in the image having a particular distance from the origin as determined by the space filling curve; and storing the occurrence matrix;

segmenting the image based on the occurrence matrix; and coding said regions and said contours of the segmented image, each region being coded depending upon the image data in the same region of the colored input image.

17. The method of claim 2, wherein the step-wise space filling curve is one of deterministic or statistical self-similarity.

18. The method of claim 2, wherein the step-wise space filling curve is a fractal.

19. The method of claim 18, wherein the fractal is a Hilbert fractal.

20. The apparatus of claims 8, 9 or 10, wherein the digital data comprises a colored image.

21. The apparatus of claim 20, wherein the colored image comprises a map, chart or plan.

* * * * *

UNITED STATES PATENT AND TRADEMARK OFFICE
CERTIFICATE OF CORRECTION

PATENT NO. : 6,058,211
DATED : May 2, 2000
INVENTOR(S) : Bormans et al.

It is certified that error appears in the above-identified patent and that said Letters Patent is hereby corrected as shown below:

Column 21,
Line 5, please delete the letter "b" and replace with -- by --.

Signed and Sealed this

Fourth Day of December, 2001

Attest:

*Nicholas P. Godici*

*Attesting Officer*

NICHOLAS P. GODICI
*Acting Director of the United States Patent and Trademark Office*